(12) United States Patent
Kim et al.

(10) Patent No.: US 12,496,730 B2
(45) Date of Patent: Dec. 16, 2025

(54) BIOMIMETIC TACTILE SENSOR, ROBOTIC SKIN COMPRISING THE SAME AND PREPARATION METHOD THEREFOR

(71) Applicant: Korea Advanced Institute of Science and Technology, Daejeon (KR)

(72) Inventors: Jung Kim, Daejeon (KR); Kyungseo Park, Daejeon (KR); Min Jin Yang, Daejeon (KR); Junhwi Cho, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 333 days.

(21) Appl. No.: 18/176,400

(22) Filed: Feb. 28, 2023

(65) Prior Publication Data
US 2023/0294301 A1  Sep. 21, 2023

(30) Foreign Application Priority Data
Mar. 15, 2022 (KR) .................. 10-2022-0031847

(51) Int. Cl.
| | |
|---|---|
| B25J 13/08 | (2006.01) |
| B25J 19/00 | (2006.01) |
| B25J 19/02 | (2006.01) |
| G01L 1/18 | (2006.01) |
| G01L 5/22 | (2006.01) |

(52) U.S. Cl.
CPC ......... *B25J 13/084* (2013.01); *B25J 19/0075* (2013.01); *B25J 19/02* (2013.01); *G01L 1/18* (2013.01); *G01L 5/228* (2013.01)

(58) Field of Classification Search
CPC ............ A61F 2002/5001; B25J 9/0012; B25J 13/084; B25J 19/0075; B25J 19/02; G01L 1/18; G01L 5/228
See application file for complete search history.

(56) References Cited

U.S. PATENT DOCUMENTS 10,852,206 B2 * 12/2020 Shimizu .................. G01L 1/127
2021/0219939 A1 * 7/2021 Alshareef ........... A61B 5/02438

FOREIGN PATENT DOCUMENTS

| CN | 114088256 A | * | 2/2022 | ............ G01L 1/142 |
|---|---|---|---|---|
| KE | 20220017346 A | * | 2/2022 | |

(Continued)

OTHER PUBLICATIONS

Park, Hyunkyu, et al. "Deep neural network approach in electrical impedance tomography-based real-time soft tactile sensor." 2019 IEEE/RSJ International Conference on Intelligent Robots and Systems (IROS). IEEE, 2019. (Year: 2019).*

(Continued)

Primary Examiner — Dale Moyer
(74) Attorney, Agent, or Firm — LEYDIG, VOIT & MAYER, LTD.

(57) ABSTRACT

Disclosed herein are a biomimetic tactile sensor, a robotic skin including the same, and a preparation method therefor. The biomimetic tactile sensor includes a base layer on which a plurality of electrodes and a plurality of microphones are arranged to be distributed, a hydrogel layer disposed on the base layer, and a stimulus receiving layer disposed on the hydrogel layer, and the biomimetic tactile sensor senses a tactile stimulus accompanied by pressure, vibration, or both.

18 Claims, 26 Drawing Sheets

(56) References Cited

FOREIGN PATENT DOCUMENTS

WO  WO-2023135753 A1 * 7/2023
WO  WO-2023135771 A1 * 7/2023

OTHER PUBLICATIONS

Boutry et al., "A hierarchically patterned, bioinspired e-skin able to detect the direction of applied pressure for robotics", Science Robotics, vol. 3, Nov. 21, 2018, pp. 10.
Schmitz et al., "Methods and Technologies for the Implementation of Large-Scale Robot Tactile Sensors", IEEE Transactions on Robotics, Jun. 2011, vol. 27, No. 3, pp. 389-400.

* cited by examiner

Fig.5A  Fig.5B
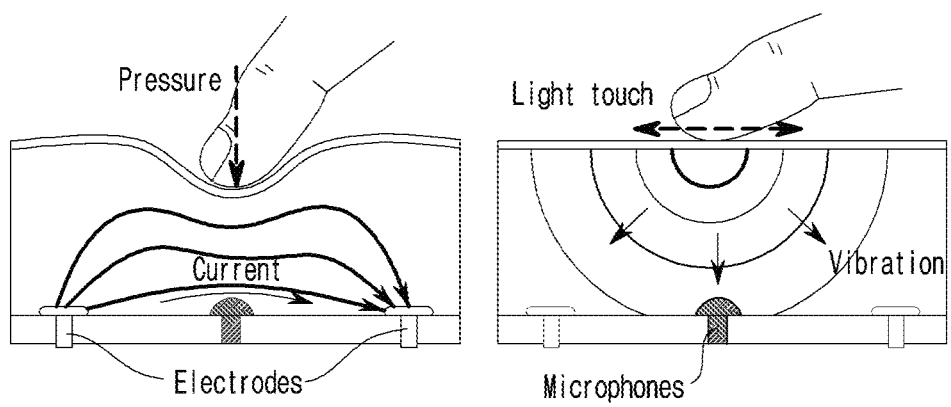
Fig.6
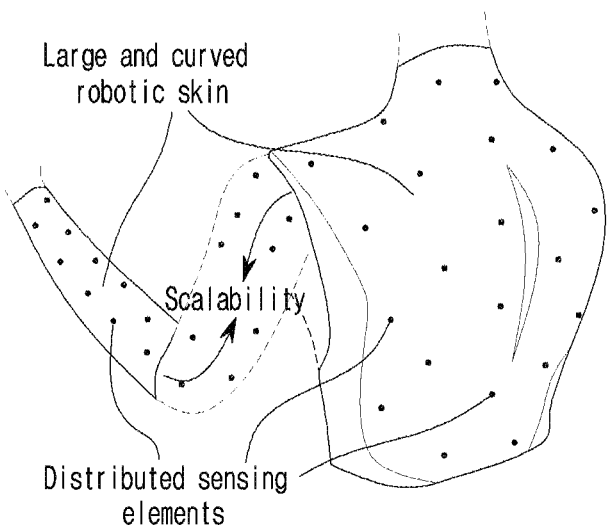

Fig.7A        Fig.7B
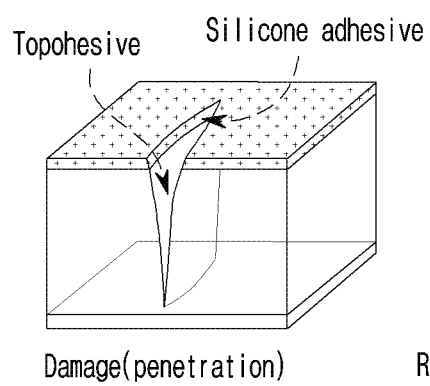
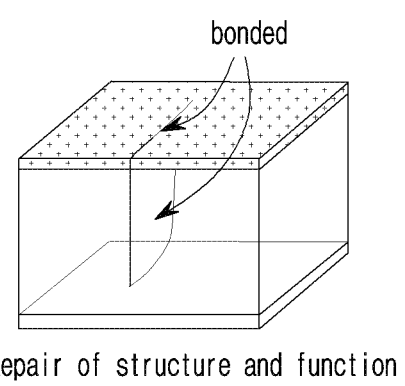
Damage(penetration)    Repair of structure and function
Fig.8
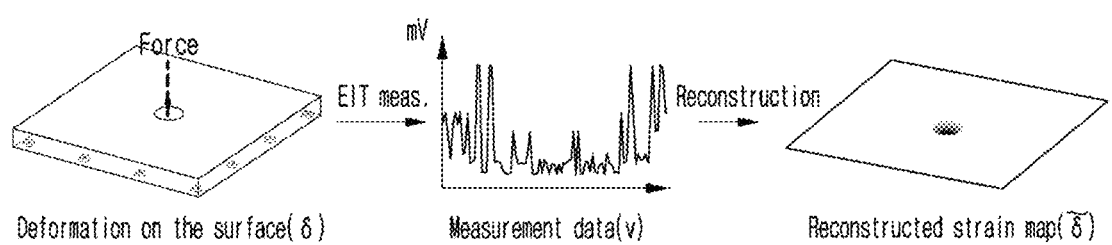
Deformation on the surface(δ)    Measurement data(v)    Reconstructed strain map(δ̃)

Fig.16

| | Wind | Pat | Stroke | Tickle | None | |
|---|---|---|---|---|---|---|
| Wind | 2493 19.9% | 0 0.0% | 8 0.1% | 3 0.0% | 0 0.0% | 99.6% 0.4% |
| Pat | 0 0.0% | 2485 19.9% | 10 0.1% | 16 0.1% | 0 0.0% | 99.0% 1.0% |
| Stroke | 4 0.0% | 5 0.0% | 2435 19.5% | 59 0.5% | 0 0.0% | 97.3% 2.7% |
| Tickle | 3 0.0% | 9 0.1% | 45 0.4% | 2422 19.4% | 0 0.0% | 97.7% 2.3% |
| None | 0 0.0% | 1 0.0% | 2 0.0% | 0 0.0% | 2500 20.0% | 99.9% 0.1% |
| | 99.7% 0.3% | 99.4% 0.6% | 97.4% 2.6% | 96.9% 3.1% | 100% 0.0% | 98.7% 1.3% |
| | Wind | Pat | Stroke | Tickle | None | |

Output Class (y-axis) / Target Class (x-axis)

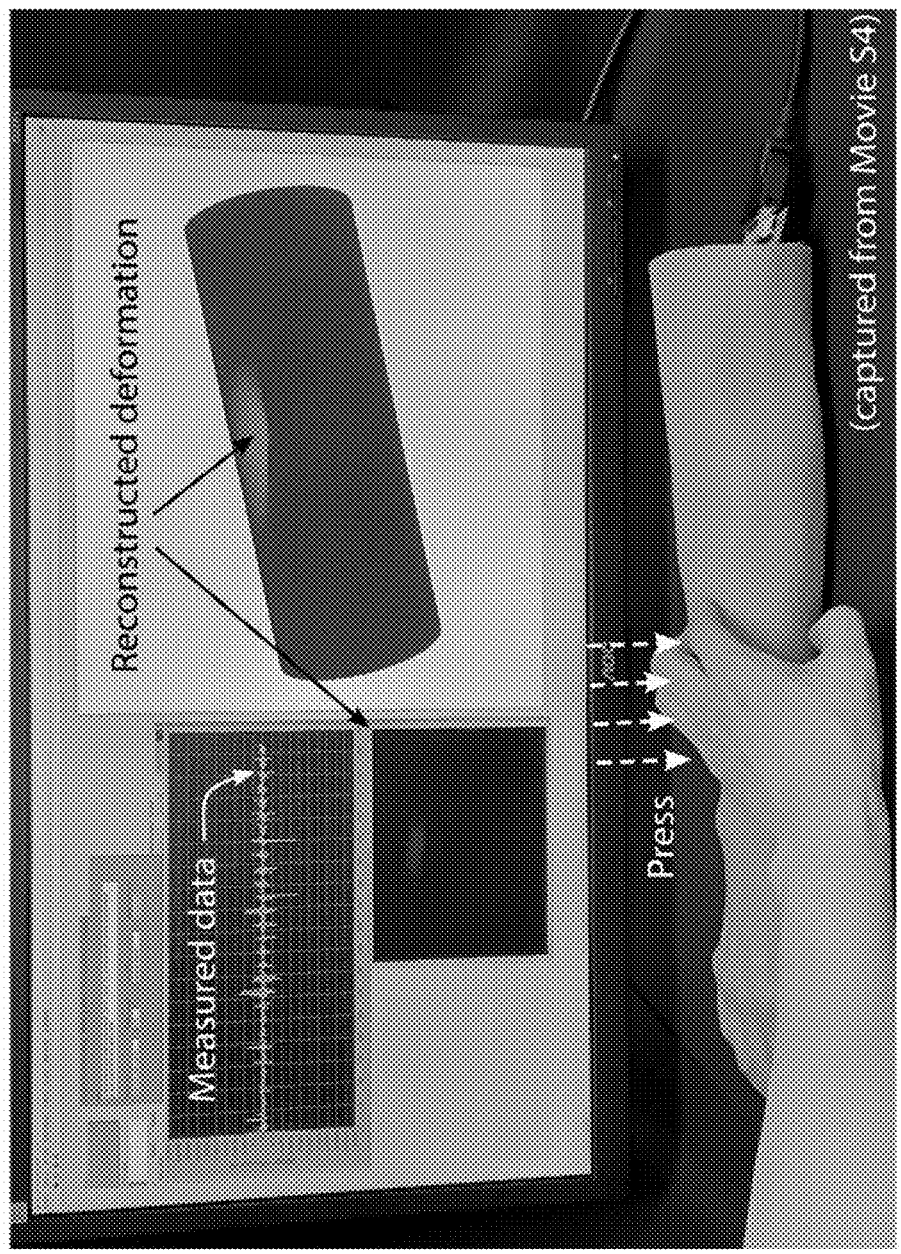

less sensitive region

Fig.29A       Fig.29B
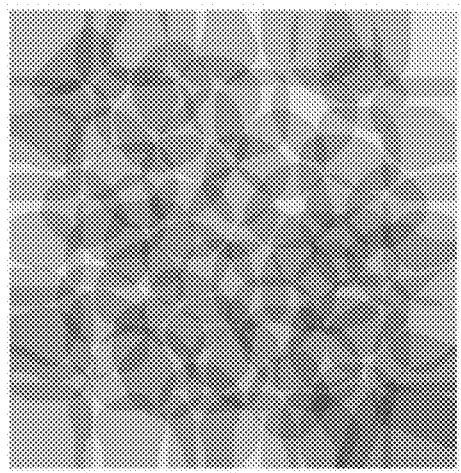 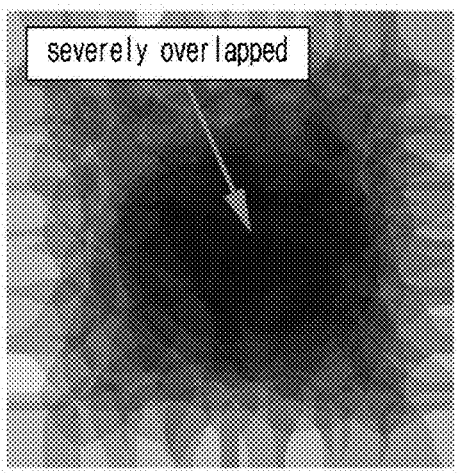
Fig.29C
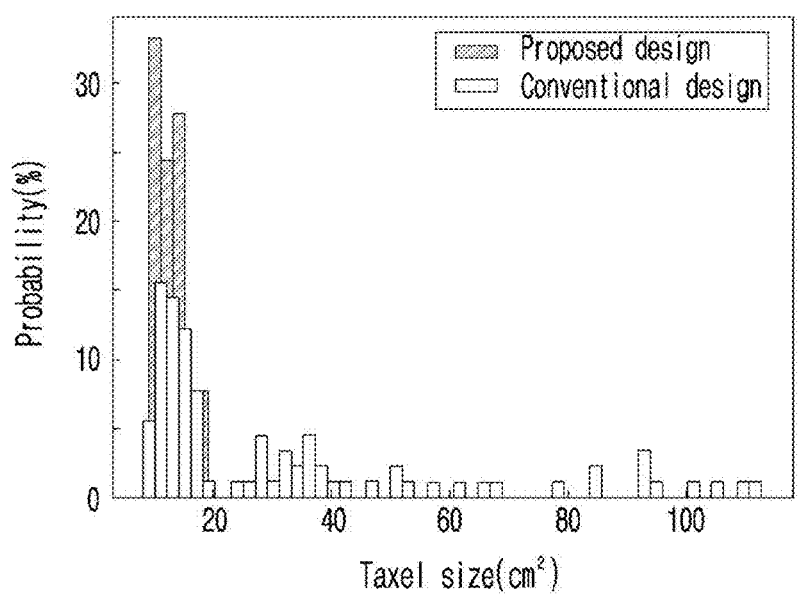

BIOMIMETIC TACTILE SENSOR, ROBOTIC SKIN COMPRISING THE SAME AND PREPARATION METHOD THEREFOR

CROSS-REFERENCES TO RELATED APPLICATION

This patent application claims the benefit of priority under 35 U.S.C. § 119 from Korean Patent Application No. 10-2022-0031847 filed Mar. 15, 2022, the contents of which are incorporated herein by reference.

BACKGROUND OF THE INVENTION

1. Field of the Invention

The present disclosure relates to a biomimetic tactile sensor, a robotic skin including the same, and a preparation method therefor.

2. Description of the Related Art

Human skin has various beneficial functions for robots in physical human-robot interaction (pHRI) environments, and accordingly, inspires the creation of robotic skin. Human skin is the largest sensory organ with an area of about two square meters and protects the entire body from external shocks. The protective function of human skin is essential for physically interacting robots to ensure human safety in the pHRI environments. For human skin as a sensory organ, it is possible to sense multi-mode tactile stimuli in four types of mechanoreceptors. A multi-mode sensing function is also an important feature for robots to recognize types of physical interactions. In addition, human skin efficiently achieves a sensing function for the large region using cognitive processing and a small number of mechanoreceptors with large receptive fields. The unique feature is advantageous for providing the practical tactile recognition function to robots. Integrating the function into a single robotic skin system is difficult, but it will be of substantial benefit to future robotics in human-robot interaction (pHRI) environments.

Many robotic skin systems have been introduced since tactile sensing in a robot's body has become a critical issue for humanoids, prostheses, and social robots. Most systems in the related art mainly focus on protection and large-area sensing functions. The most common approach for the above is to use two vertically extending electrode lines (row and column electrodes) to form an array of sensing elements where each intersection of the row and column electrodes forms a single tactile sensor (as an example of the relates art, see Non Patent Literature 1: C. M. Boutry, M. Negre, M. Jorda, O. Vardoulis, A. Chortos, O. Khatib, Z. Bao, A 531 hierarchically patterned, bioinspired e-skin able to detect the direction of applied pressure 532 for robotics. Sci. Robot. 3, 1-10 (2018)). The aforementioned approach has the advantage of obtaining a large sensing region with a small number of electrodes, but has disadvantages such as manufacturing complexity for large size and 3D geometries, fragility, complex wiring and difficult repairs. Another approach is to modularize a sensing element using a microcontroller and digital communication (as an example of the relates art, see Non Patent Literature 2: A. Schmitz, P. Maiolino, M. Maggiali, L. Natale, G. Cannata, G. Metta, Methods and technologies for the implementation of large-scale robot tactile sensors. IEEE Trans. 542 Robot. 27, 389-400 (2011)). The module is covered with an elastomer to provide the protective function. The module-based robot skin has a capability of achieving high scalability and robustness, but has the disadvantage of having limited flexibility due to a rigid integrated circuit chip and consuming a lot of power.

Accordingly, the present inventors have conducted research on the robotic skin, and as a result, have completed the present disclosure by, as a biomimetic tactile sensor capable of being used as a robotic skin, developing a biomimetic tactile sensor for robotic skin that has functions similar to those of human skin, such as a protective function, multi-mode tactile sensation, high scalability, and ease of repair.

SUMMARY OF THE INVENTION

Embodiments of the present disclosure is directed to provide a biomimetic tactile sensor, a robotic skin including the same, and a preparation method therefor.

According to an aspect of the present disclosure, there is provided a biomimetic tactile sensor including: a base layer on which a plurality of electrodes and a plurality of microphones are arranged to be distributed; a hydrogel layer disposed on the base layer; and a stimulus receiving layer disposed on the hydrogel layer, in which the biomimetic tactile sensor senses a tactile stimulus accompanied by pressure, vibration, or both.

In this case, the hydrogel layer may have piezoresistance and act as a medium for transmitting vibration.

The tactile sensor may sense a pressure-based tactile stimulus using electrical impedance tomography (EIT).

The tactile sensor may reconstruct data measured by the electrical impedance tomography (EIT) using an artificial neural network.

The tactile sensor may sense a vibration-based dynamic tactile stimulus through the microphones using passive acoustic tomography (PAT).

The tactile sensor may analyze at least one of an intensity and an arrival time of vibration received by the microphones to determine a position where the vibration occurs.

The tactile sensor may classify dynamic tactile stimuli received through the microphones using an artificial neural network.

The dynamic tactile stimulus may include tapping, rubbing, sweeping, scratching, and tickling.

A structure and function of the stimulus receiving layer and the hydrogel layer may be recoverable from physical damage.

The stimulus receiving layer may be a polymer film having elasticity, preferably the stimulus receiving layer may have a larger Young's modulus than the hydrogel layer, still more preferably, may be a silicone polymer film.

The microphone may be a microphone in which a capsule film made of a polymer having elasticity is formed on an upper surface in contact with the hydrogel, and the capsule film may have an empty space therein.

According to another aspect of the present disclosure, there is provided a preparation method for the biomimetic tactile sensor, the preparation method including: arranging a plurality of electrodes and a plurality of microphones to be distributed on a base layer; forming a hydrogel layer on the base layer; and forming a stimulus receiving layer on the hydrogel layer.

The microphone may be a microphone in which a capsule film made of a polymer having elasticity is formed on an upper surface in contact with the hydrogel.

The forming of the hydrogel layer may include applying a hydrogel precursor solution on the base layer, and photocuring the hydrogel precursor solution.

According to yet another aspect of the present disclosure, there is provided a robotic skin including the biomimetic tactile sensor.

BRIEF DESCRIPTION OF THE DRAWINGS

FIG. 5A is a diagram schematically showing a function of the biomimetic tactile sensor as a medium for transmitting a pressure-based stimulus, according to an embodiment;

FIG. 5B is a diagram schematically showing a function of the biomimetic tactile sensor as a medium for transmitting a vibration-based stimulus, according to an embodiment;

FIG. 6 is a diagram schematically showing that the biomimetic tactile sensor according to an embodiment may be formed over various surfaces;

FIGS. 7A and 78B are diagrams schematically showing ease of recovery of the biomimetic tactile sensor according to an embodiment, FIG. 7A is a diagram showing a state that the sensor is damaged, and FIG. 7B is a diagram showing recovery of the damaged;

FIG. 8 is a schematic diagram schematically showing a method of sensing deep pressure using electrical impedance tomography (EIT) by a tactile sensor according to an embodiment;

FIG. 16 is a diagram showing a result of classifying dynamic tactile stimuli of a biomimetic tactile sensor according to an embodiment;

FIG. 17 shows before restoration and FIG. 18 shows after restoration;

FIG. 20 is a photograph of a result of measuring tactile performance of the cosmetic prosthesis of FIG. 19;

FIGS. 22A and 22B show strain energy during the indentation experiment, FIGS. 23A and 23B show equivalent elastic deformation due to indentation, and FIGS. 24A and 24B show an equivalent (von-mises) stress due to indentation;

FIG. 29A is a taxel map for the electrode arrangement of FIG. 27A;

FIG. 29B is a taxel map for the electrode arrangement of FIG. 27B;

FIG. 29C is a histogram of taxel sizes for the electrode arrangements of FIGS. 27A and 27B.

DESCRIPTION OF THE PREFERRED EMBODIMENTS

Hereinafter, embodiments of the present disclosure will be described in detail with reference to the drawings. However, it should be understood that the present disclosure is not limited to the specific embodiments below, and includes all modifications, equivalents, and substitutes included in the spirit and scope of the present disclosure.

The terms used herein are merely provided to describe specific embodiments, and the present disclosure is not limited thereto.

Throughout the specification and claims, the terms "first" and "second" are used herein for purposes of distinction and in no way mean indication or anticipation of order or priority, and may be used to describe various components, but the components are not limited by the terms. For example, without departing from the scope of the present disclosure, a first element could be termed a second element, and similarly, a second element could be termed a first element.

In addition, it will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present.

In addition, the terms "includes" and/or "including", when used herein, merely specify the presence of stated features, integers, steps, operations, elements, components, and/or groups thereof, but do not exclude the possibility of the presence or addition of one or more other features, integers, steps, operations, elements, components, and/or groups thereof.

In addition, unless otherwise defined, all terms used herein, including technical or scientific terms, have the same meaning as commonly understood by those of ordinary skill in the art to which the embodiments of the present disclosure belong. Terms, such as those defined in commonly used dictionaries, should be interpreted as having a meaning that is consistent with their meaning in the context of the related art and will not be interpreted in an idealized or overly formal sense unless expressly so defined herein.

According to an aspect of the present disclosure, there is provided a biomimetic tactile sensor including
a base layer on which a plurality of electrodes and a plurality of microphones are arranged to be distributed;
a hydrogel layer disposed on the base layer; and
a stimulus receiving layer disposed on the hydrogel layer, in which the biomimetic tactile sensor senses a tactile stimulus accompanied by pressure, vibration, or both.

Hereinafter, a biomimetic tactile sensor according to an embodiment will be described in detail with reference to the drawings.

Figure 1:
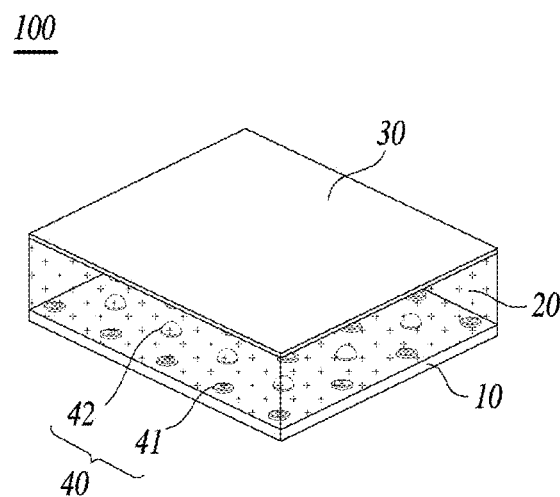
FIG. 1 is a three-dimensional view of a biomimetic tactile sensor according to an embodiment.
Figure 2:
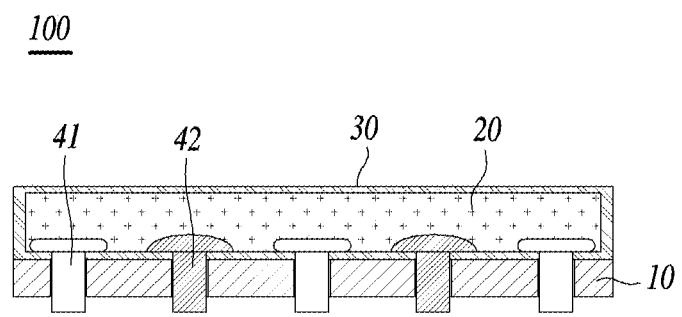
FIG. 2 is a cross-sectional view of the biomimetic tactile sensor according to an embodiment.

FIG. 1 is a three-dimensional view of the biomimetic tactile sensor according to an embodiment, and FIG. 2 is a cross-sectional view of the biomimetic tactile sensor according to an embodiment.

Referring to FIGS. 1 and 2, a biomimetic tactile sensor 100 according to an embodiment includes a base layer 10, a hydrogel layer 20 disposed on the base layer 10, and a stimulus receiving layer 30 disposed on the hydrogel layer 20, and includes a plurality of electrodes 41 and a plurality of microphones 42, which are arranged to be distributed in the base layer 10, as sensing elements 40. The tactile sensor 100 may simultaneously sense a tactile stimulus accompanied by pressure, vibration, or both through the structure.

Biomimetic Multi-Layer Structure

Figure 3A:
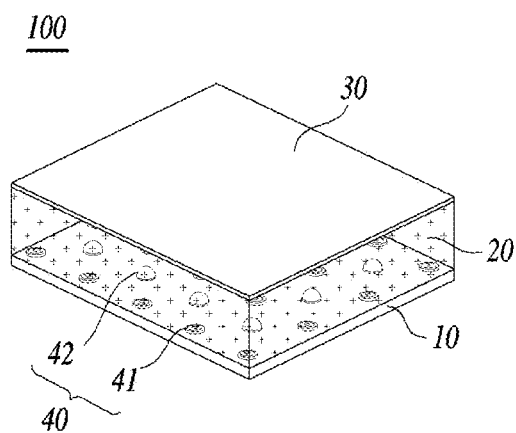
FIG. 3A is a diagram showing the biomimetic tactile sensor according to an embodiment.
Figure 3B:
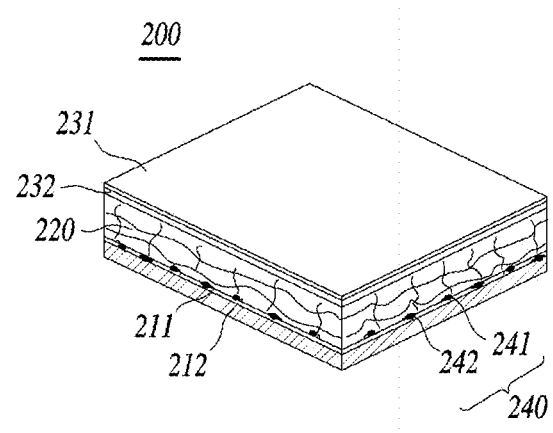
FIG. 3B is a diagram showing human skin tissue.

FIG. 3A is a diagram showing the biomimetic tactile sensor according to an embodiment, and FIG. 3B is a diagram showing human skin tissue.

Referring to FIG. 3B, human skin consists of three basic layers (that is, epidermis 231, dermis 232, and hypodermis 220) with different characteristics and functions. The epidermis 231 is the outermost layer of skin that forms a waterproof barrier to prevent dehydration and has a considerably high Young's modulus of about 2 MPa. The dermis 232 is an elastic layer present under the epidermis, which is composed of elastic tissues and fibers to give elasticity and toughness to the skin. The reticular dermis 232 may stretch up to 25% due to the collagen fibers ensuring complete recovery of tissue shape and structure after deformation. In addition, the dermis 232 is physically engaged with the epidermis to resist the shear forces that cause the dermis and the epidermis to slide against each other, which generates a spatial filtering effect that distributes the force and pressure over a wider region. Finally, the hypodermis 220 is a thick and highly deformable layer present between the dermis 232 and a fascia 211 on a muscle 212. The hypodermic tissue 220 mainly consists of soft and loose connective tissue and allows the skin to efficiently absorb and attenuate external pressure due to its mechanical properties. In addition, four primary tactile mechanoreceptors are present in different layers of human skin. That is, Merkel's disks (not shown) and Meissner's corpuscles (not shown) are located toward the skin surface, and Ruffini' corpuscles 241 and Pacinian corpuscles 242 are located deeper inside the skin.

Referring to FIG. 3A, The biomimetic tactile sensor 100 according to an embodiment is a component corresponding to the epidermis, dermis, and hypodermis of the human skin, and includes a stimulus receiving layer 30 and a hydrogel layer 20 and a base layer 10, where the three layers are strongly bonded to each other so as not to separate between layers during physical interaction.

In addition, the biomimetic tactile sensor 100 according to an embodiment includes sensing elements 40 as a component corresponding to the Pachinian corpuscle 241 and the Rupini ending 242, which are mechanical receptors 240 of human skin, and includes electrodes 41 and microphones 42 as sensing elements 40 for multi-mode tactile sensing.

The biomimetic tactile sensor 100 according to an embodiment provides the following advantages.

First, the biomimetic tactile sensor 100 according to an embodiment has a multi-layer structure including the hydrogel layer 20 and the stimulus receiving layer 30, and provides a protective function to both a target object, such as a robot having the tactile sensor 100 as a robotic skin, and a subject, such as a human being in contact with the tactile sensor 100, through the multi-layer structure.

Figure 4:
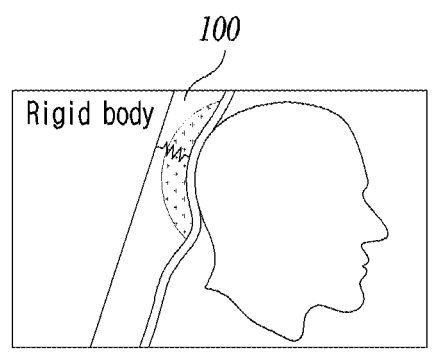
FIG. 4 is a diagram schematically showing a protective function of the biomimetic tactile sensor according to an embodiment.

FIG. 4 is a diagram schematically showing that the biomimetic tactile sensor 100 according to an embodiment has a multi-layer structure and thus has a protective function of protecting both the target object and the subject.

As shown in FIG. 4, the multi-layer structure of the hydrogel layer 20 and the stimulus receiving layer 30 has a spatial filtering effect for improving the cushioning function of the skin.

To this end, the stimulus receiving layer 30 may be preferably composed of a polymer film having elasticity, more preferably may have a larger Young's modulus than the hydrogel layer, and still more preferably, may be a silicone polymer film.

The compliance of the hydrogel layer 20 effectively may buffer external force, while the stimulus receiving layer 30 may withstand the force and distribute it over a wider region. Accordingly, it can be seen that, when the biomimetic tactile sensor 100 according to an embodiment does not include the stimulus receiving layer 30, a force applied to a small region may cause local deformation of the hydrogel layer, and this deformation may be transmitted to the embedded sensor element, which may result in weakening of the protective function for protecting the sensor element, whereas, the protective function is improved by disposing the stimulus receiving layer on the hydrogel layer 20, which can be confirmed through Experimental Example 7, FIGS. 22A, 22B, 23A, 23B, 24A and 24B.

In addition, the stimulus receiving layer 30 may be a polymer film having elasticity and may have gas permeability, but prevent moisture from evaporating. Accordingly, it is possible to suppress the increase in resistance by preventing direct contact between light and air in the hydrogel layer and thus preventing dehydration of the hydrogel layer. This can be confirmed through Experimental Example 7 and FIGS. 25 and 26.

The elastic modulus and thickness of the hydrogel layer and the stimulus receiving layer 30 may be appropriately adjusted to meet safety standards for trauma such as bruises and lacerations.

Secondly, through the multi-layer structure, the biomimetic tactile sensor 100 according to an embodiment may function as the above-described protective cover and also perform a functional role of transmitting a tactile stimulus to the sensing elements.

FIG. 5A showing a function of the biomimetic tactile sensor sensing pressure-based tactile stimulus, according to an embodiment and FIG. 5B is a diagram showing a function of the biomimetic tactile sensor tactile stimulus tactile stimulus, according to an embodiment.

FIGS. 5A and 5B schematically show that the hydrogel layer 20 of the biomimetic tactile sensor 100 according to an embodiment functions as a transmission medium for transmitting a tactile stimulus to the sensing element 40.

Referring to FIGS. 5A and 5B, the hydrogel layer 20 is made of a hydrogel, and at this time, the hydrogel layer has piezoresistance and acts as a medium for transmitting vibration.

Therefore, the hydrogel of the tactile sensor 100 is physically deformed by pressure-based tactile stimulus (external stimulus or contact), and electrical resistance thereof is changed. Accordingly, the hydrogel layer 20 may transmit a pressure-based tactile stimulus to the electrode 41, which is a sensing element 40 that senses a change in piezoresistance. In addition, the hydrogel may act as a medium for transmitting vibration, and thus, a vibration-based tactile stimulus may be transmitted to the microphone 42, which is the sensing element 40 for detecting vibration.

Thirdly, the biomimetic tactile sensor 100 according to an embodiment may freely adjust its size, so it may have high scalability, and it may be formed on various surfaces, so it has excellent applicability.

FIG. 6 is a diagram schematically showing that the biomimetic tactile sensor 100 according to an embodiment may be formed over a non-uniform large-area region.

In the biomimetic tactile sensor 100 according to an embodiment, each sensing element 40 has a wide receiving region for a tactile stimulus. Accordingly, the sensing elements 40 may be spaced apart without being directly connected to each other, which makes it possible to freely add more sensing elements 40 to easily do sensing over a wider area and to be easily applied to a surface having a complex shape such as a curve.

Lastly, the biomimetic tactile sensor 100 according to an embodiment may restore its original form and function even if damage such as incision occurs.

FIGS. 7A and 7B are diagrams schematically showing that the structure and function of the biomimetic tactile sensor 100 according to an embodiment may be restored by an adhesive when damaged due to cutting or the like, FIG. 7A is a diagram showing a state that the sensor is damaged, and FIG. 7B is a diagram showing recovery of the damaged.

As shown in FIGS. 7A and 7B, the multi-layer structure of the tactile sensor may be locally lacerated by excessive force or damaged by pressure, but the surface as well as the internal structure may be restored by using an appropriate adhesive for crosslinking the polymer, and accordingly, electrical and mechanical properties as a tactile sensor may be restored, and ultimately the structure and function as a robotic skin may be restored.

Pressure-Based Tactile Sensing Method Using Electrical Impedance Tomography (EIT)

The biomimetic tactile sensor 100 according to an embodiment may sense pressure applied from the outside.

To this end, the tactile sensor 100 includes the hydrogel layer 20 as a pressure-sensitive material. In the hydrogel 20 having electrical conductivity, local physical deformation occurs where pressure or force is applied. As a result, current may not pass through the recessed part of the hydrogel, showing piezoresistive properties. In addition, the hydrogel exhibits low piezoresistive hysteresis due to uniform bulk resistance.

Accordingly, the biomimetic tactile sensor 100 according to an embodiment measures a position where a pressure-based tactile stimulus is generated and the intensity of the stimulus by using electrical impedance tomography (EIT), which is a non-destructive imaging technique widely used in medical imaging, geophysical exploration, and human-machine interfaces, as a method of reconstructing a conductivity distribution by injecting a current into an electrode and measuring a voltage.

FIG. 8 is a schematic diagram schematically showing a method of sensing deep pressure using electrical impedance tomography (EIT) by the tactile sensor 100 according to an embodiment.

Referring to FIG. 8, in the tactile sensor 100, when pressure is applied, deformation occurs in the hydrogel layer 20, and the pressure-based stimulus may be indirectly measured by a method of measuring the deformation through the metal electrodes 41 arranged to be evenly distributed on the base layer 10.

Specifically, in the tactile sensor 100, current (for example, a square wave current of about 30 kHz) is injected through a pair of electrodes, and a resulting voltage is measured at the pair of electrodes.

Figure 9:
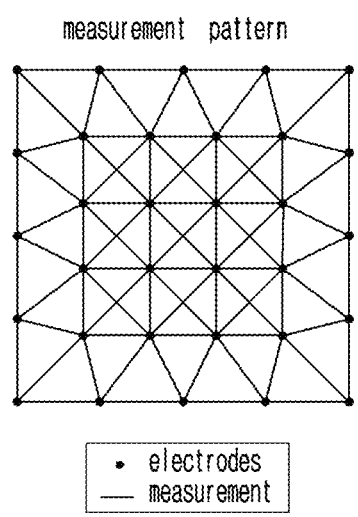
FIG. 9 is a diagram schematically showing a measurement pattern of electrodes for measurement by tomography (EIT)

FIG. 9 is a diagram schematically showing a measurement pattern of electrodes for measuring the deformation of the hydrogel in the same method described above, and as shown in FIG. 9, the measurement may be performed in a method of repeating measurement on different electrode pairs according to a predetermined measurement pattern for a plurality of electrodes that are arranged to be distributed.

The biomimetic tactile sensor 100 according to an embodiment may reconstruct measurement data measured by electrical impedance tomography (EIT) as described above using an artificial neural network.

The reconstruction may be performed using an EIT reconstruction algorithm based on a deep neural network (DNN).

The tactile sensor according to an embodiment may measure the pressure applied to the sensor with high accuracy, high noise robustness, and fast reconstruction speed through electrical impedance tomography (EIT) and deep neural network (DNN)-based reconstruction methods.

Figure 10:
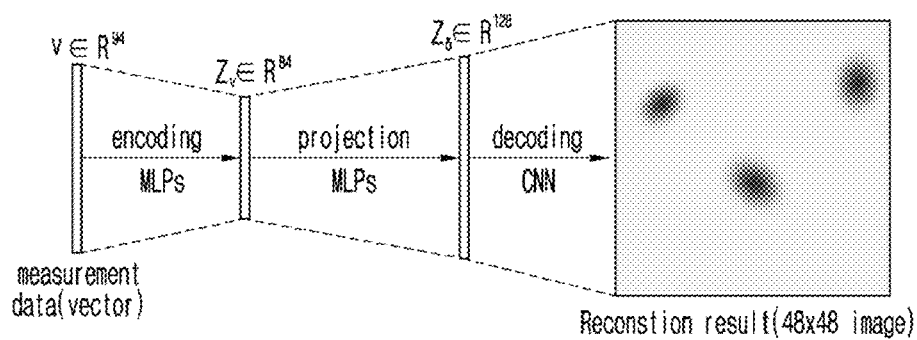
FIG. 10 is a diagram illustrating an exemplary method of reconstructing data measured by electrical impedance tomography (EIT) by a tactile sensor according to an embodiment through a deep neural network (DNN)-based algorithm.

FIG. 10 is a diagram illustrating an exemplary method of reconstructing data measured by electrical impedance tomography (EIT) through a deep neural network (DNN)-based algorithm.

As shown in FIG. 10, the measurement data may be reconstructed by mapping measurement vectors to latent variables through a multi-layer perceptron (MLP) method and generating transformation maps from the latent variables through a convolutional neural network (CNN).

Figure 11:
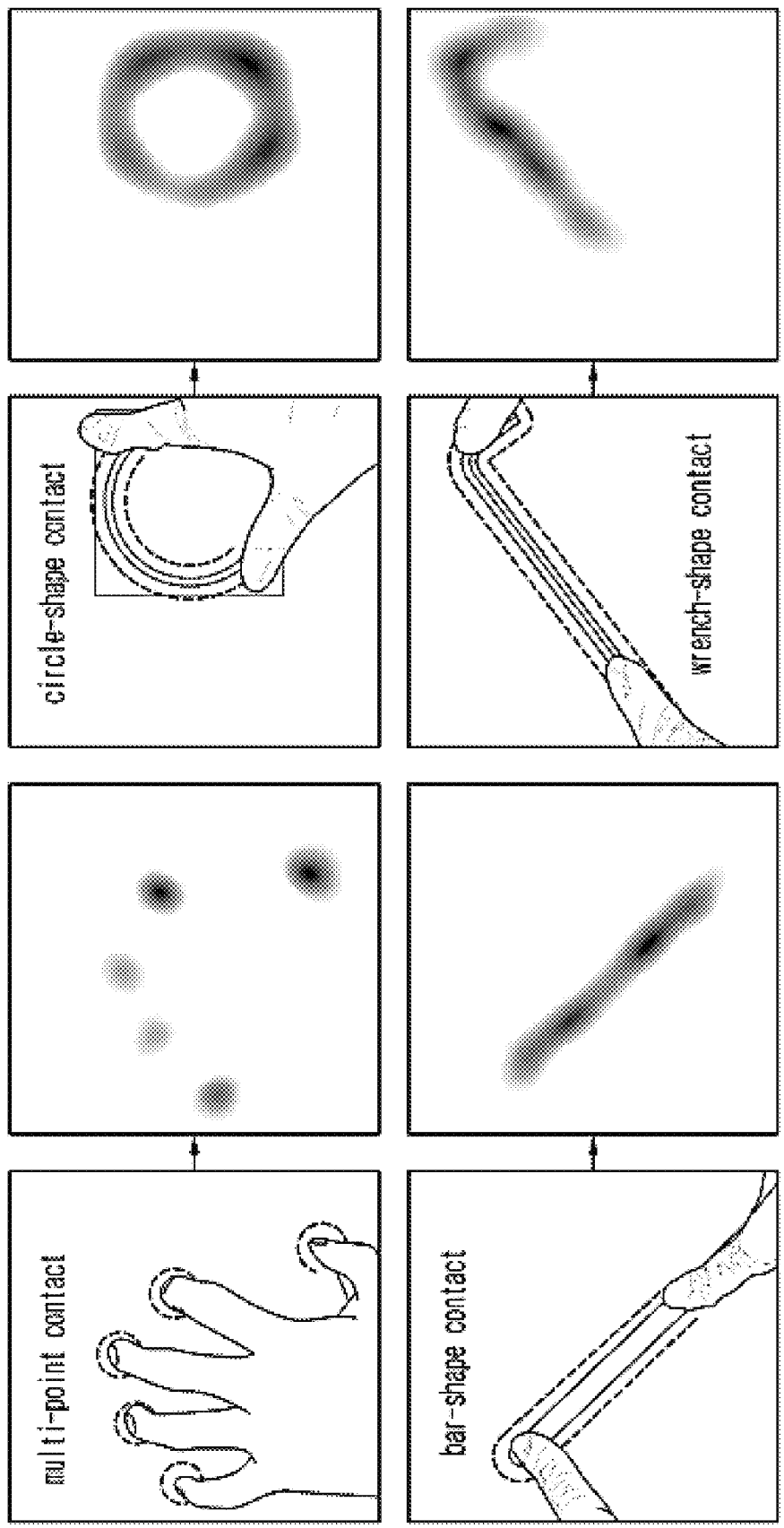
FIG. 11 is a diagram showing pressure-based tactile stimulus sensing performance using EIT and DNN of a tactile sensor according to an embodiment.

In this regard, it can be confirmed through Experimental Example 1 and FIG. 11 that the biomimetic tactile sensor 100 according to an embodiment may successfully measure the pressure applied by objects of various shapes, and furthermore, it can be confirmed through Experimental Example 3 that the biomimetic tactile sensor 100 according to an embodiment has very excellent position identification performance for a pressure-based tactile stimulus.

Vibration-Based Dynamic Tactile Sensing Method Using Passive Acoustic Tomography (PAT)

The biomimetic tactile sensor 100 according to an embodiment may sense a vibration-based dynamic tactile stimulus applied from the outside.

Human skin recognizes dynamic tactile stimuli through vibration-sensitive mechanoreceptors (Pachinian corpuscles, or the like) because dynamic stimuli generally generate vibrations on the skin surface. In this case, the "dynamic tactile stimuli" or "dynamic stimuli" are stimuli that generate vibration, including tapping, rubbing, sweeping, scratching, and tickling.

The biomimetic tactile sensor 100 according to an embodiment may sense a dynamic tactile stimulus in a manner similar to that of human skin.

Specifically, when a dynamic tactile stimulus is applied to the stimulus receiving layer 30 of the tactile sensor 100, micro-vibration is generated, and the micro-vibration is measured through a plurality of microphones 42 evenly distributed on the base layer 10 over the multi-layer structure.

Figure 12:
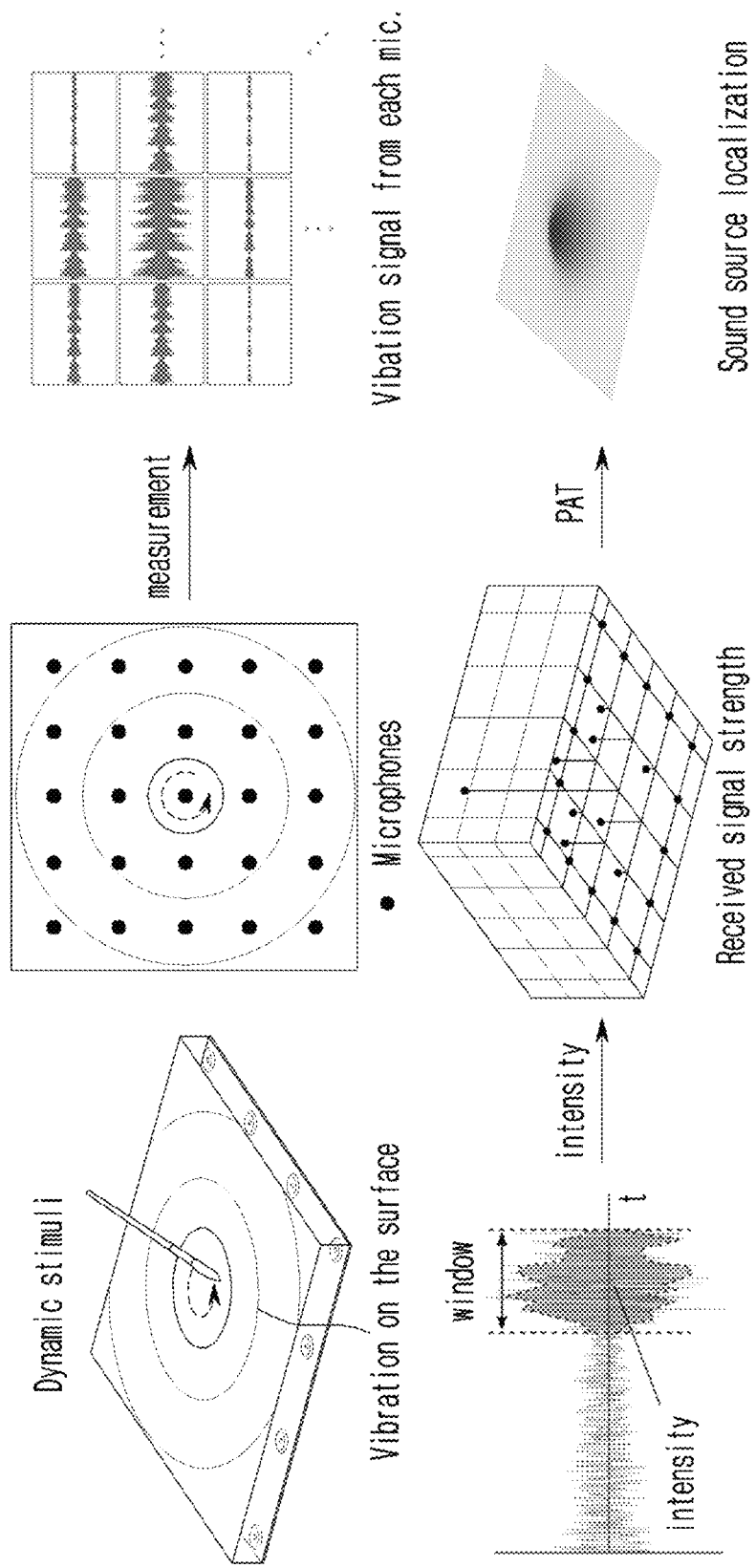
FIG. 12 is a schematic diagram schematically showing a method of sensing a vibration-based dynamic tactile stimulus using passive acoustic tomography (PAT) by a biomimetic tactile sensor according to an embodiment.

FIG. 12 is a schematic diagram schematically showing a method of sensing a vibration-based dynamic tactile stimulus using passive acoustic tomography (PAT) by the biomimetic tactile sensor 100 according to an embodiment.

The tactile sensor 100 may analyze at least one of an intensity and an arrival time of vibration received by the microphones 42 to determine a position where the vibration occurs.

Specifically, the energy of vibration is gradually attenuated as it is transmitted, and a strong signal is measured near a position where the stimulus is applied, accordingly. Therefore, using passive acoustic tomography (PAT), the position where the dynamic stimulus is generated (vibration source) and the difference in signal strength of each microphone may be calculated the other way around. In addition, each microphone continuously measures the vibration generated by a dynamic stimulus, and the signal strength is defined as the power value of a signal generated in a specific predetermined time range. Thereafter, the position (vibration source) where the dynamic stimulus is generated is determined by finding an optimal position in which a cost function derived from the attenuation model of the signal strength is minimized.

Figure 15:
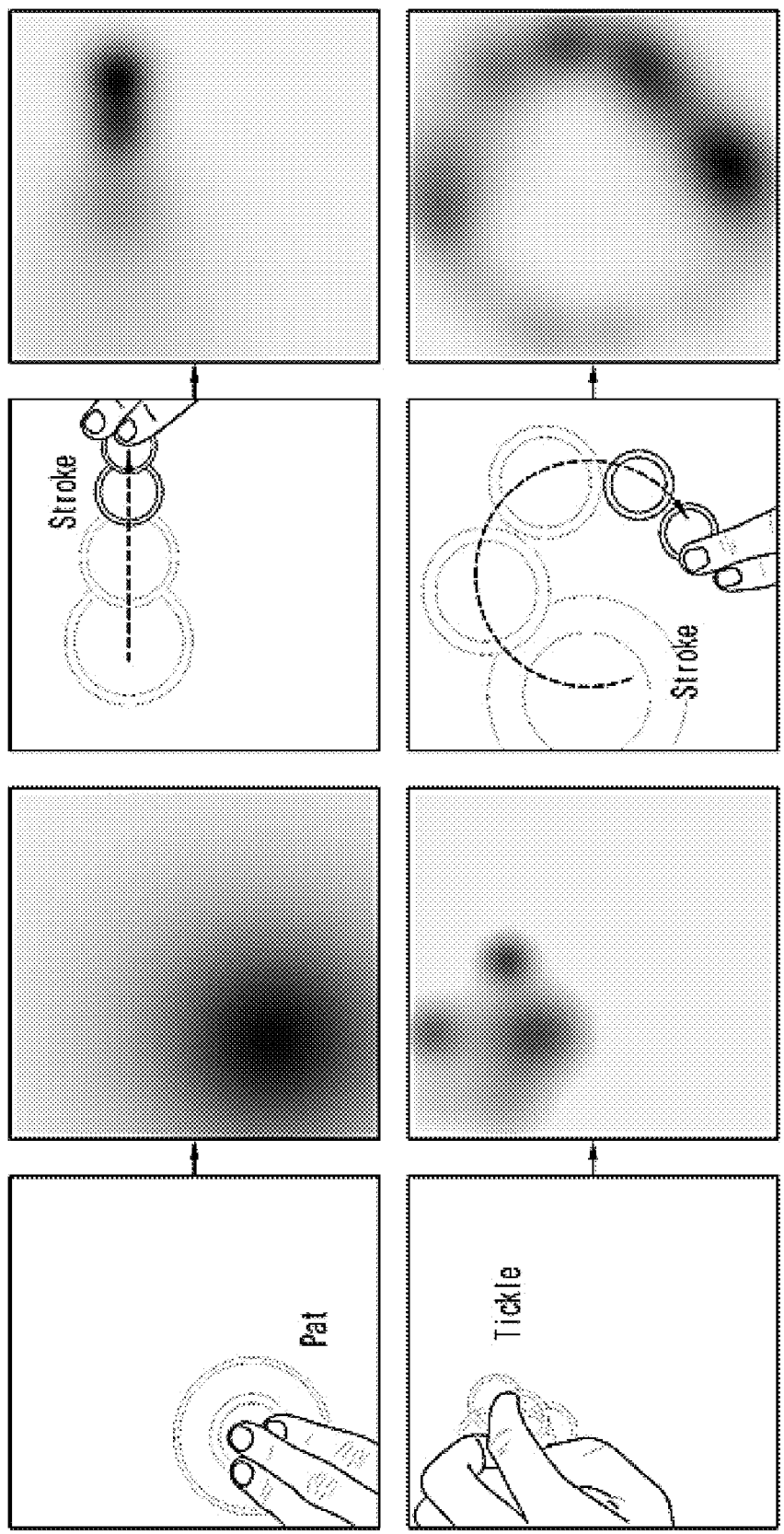
FIG. 15 is a diagram showing vibration-based dynamic tactile stimulus sensing performance using PAT of a tactile sensor according to an embodiment.

In this regard, it can be confirmed through Experimental Example 3 that the biomimetic tactile sensor 100 according to an embodiment has very excellent position identification performance for the vibration-based dynamic tactile stimulus, and it can be confirmed through Experimental Example 2 and FIG. 15 that the biomimetic tactile sensor 100 according to the embodiment may measure various dynamic tactile stimuli.

Figure 13:
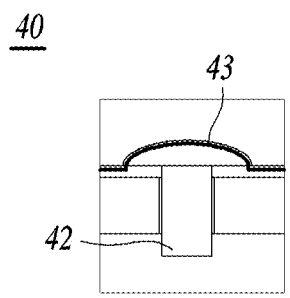
FIG. 13 is a diagram illustrating a sensing element according to another embodiment for sensing a dynamic stimulus.

Meanwhile, FIG. 13 is a diagram showing the sensing element 40 according to another embodiment for sensing a dynamic tactile stimulus, and as shown in FIG. 13, the sensing element 40 according to the other embodiment may have a capsule film 43 made of a polymer having elasticity formed on an upper surface of the microphone 42 in contact with the hydrogel to further expand the receiving region by the dynamic stimulus of the microphone 42, and the capsule film 43 may have an empty space therein. The sensing element 40 including the microphone 42 and the capsule film 43 may have a large receiving region for micro-vibration as compared with the microphone 42 without the capsule film 43 formed thereon.

Figure 14A:
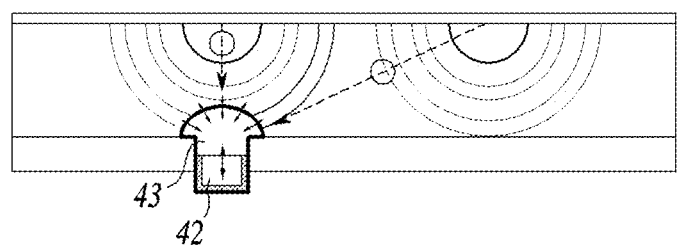
FIG. 14A is a diagram schematically showing sensing performance when a capsule film is formed on a microphone.
Figure 14B:
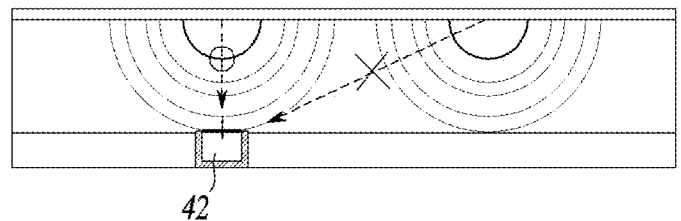
FIG. 14B is a diagram schematically showing sensing performance when a capsule film is not formed on a microphone.

FIG. 14A is a diagram schematically showing sensing performance when the capsule film 43 is formed on the microphone 42, FIG. 14B is a diagram schematically showing sensing performance when a capsule film is not formed on a microphone.

Referring to FIGS. 14A and 14B, the microphone 42 is a sensing element that detects vibration, and may sense vibration generated by direct stimulation or vibration transmitted through a medium. Accordingly, the dynamic stimulus at a position close to the microphone 42 directly stimulates the microphone 42 to transmit vibration, or has a large vibration intensity so that the vibration may be easily transmitted to the microphone 42; while when the distance between the position where the vibration is generated (vibration source) and the microphone is long, the size of the vibration is small and it may be difficult to sense the vibration.

In the microphone having the capsule film formed, the capsule film may be physically deformed by vibration transmitted from the hydrogel, the air filled in the empty space inside may vibrate due to the physical deformation, and the vibration of the air may be transmitted to the microphone. Accordingly, it is possible to have a larger receiving region for micro vibration.

Classification of Dynamic Tactile Stimulus Using Convolutional Neural Network (CNN)

The biomimetic tactile sensor 100 according to an embodiment may classify dynamic tactile stimuli received through the microphones using an artificial neural network.

Human beings recognize tactile stimuli through their skin, and the stimuli are transmitted in various meanings. That is, touches may represent different dynamic tactile stimuli having different meanings according to the intensities, positions, and patterns of the stimuli. For example, tickling consists of repeated light touches, and stroking consists of continuous, moving vibration patterns.

The biomimetic tactile sensor 100 according to an embodiment may obtain a history of the intensity of vibration for each of the microphones 42 and obtain a spectrogram representing a frequency spectrum over time for each microphone to form a feature image representing a space-time pattern of vibration, and then may apply the CNN to the feature image to classify the dynamic tactile stimuli into tapping, rubbing, sweeping, scratching, tickling, and the like, based on spatiotemporal characteristics of vibration.

Recovering of Structure and Function of Sensor

The biomimetic tactile sensor 100 according to an embodiment has the advantage of being able to recover its structure and function due to physical damage.

Robotic skin may be constantly exposed to physical obstacles in an unstructured environment. The robotic skin is difficult to apply in real applications when the robotic skin needs to be replaced frequently due to damage.

The biomimetic tactile sensor 100 according to an embodiment exhibits excellent functions as the robotic skin by having high durability, robustness against local damage, and repairability.

Specifically, the biomimetic tactile sensor 100 according to an embodiment may exhibit high durability and effectively absorb external force through a multi-layer structure. The electrode and the microphone are not directly exposed to an external force through the multi-layer structure, and thus, the sensor may be activated even if the stimulus receiving layer and the hydrogel layer of the multi-layer structure are damaged. In addition, the stimulus receiving layer and the hydrogel layer of the multi-layer structure may be restored using an appropriate adhesive.

Application to Various Surfaces

Each sensing element 40 in the biomimetic tactile sensor 100 according to an embodiment may have a wide sensing receiving region and may be disposed thereon in a distributed manner, and thus, it may have high scalability over a wide surface and may be easily formed on a complex and variously shaped surface having curves and flexures.

In another aspect, there is provided a preparation method for the biomimetic tactile sensor including: arranging a plurality of electrodes and a plurality of microphones to be distributed on a base layer; forming a hydrogel layer on the base layer; and forming a stimulus receiving layer on the hydrogel layer.

Hereinafter, a preparation method for the biomimetic tactile sensor according to an embodiment will be described in detail with reference to the drawings.

Figure 30:
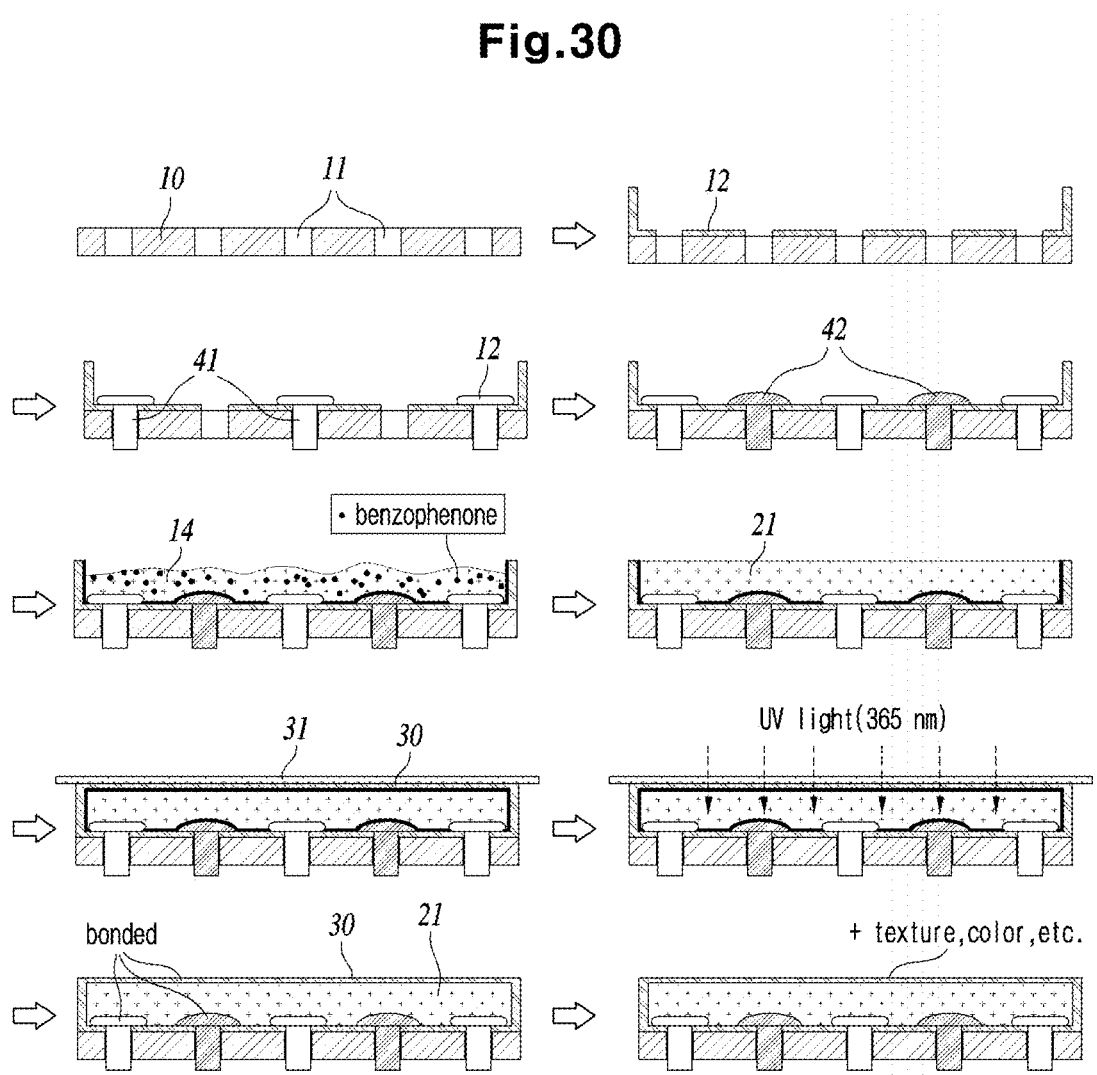
FIG. 30 is a manufacturing process diagram for a biomimetic tactile sensor according to an embodiment.

FIG. 30 is a process diagram for the preparation method for the biomimetic tactile sensor according to an embodiment.

First, a step of arranging a plurality of electrodes 41 and a plurality of microphones 42 to be distributed on the base layer 10 is performed.

In the above step, the base layer may be a rigid substrate or a flexible substrate. For example, the base layer 10 may be a flat substrate made of plastic or wood material such as acrylic below, or may be a cylindrical substrate with an empty interior of the material, but is not limited thereto.

In order to arrange the plurality of electrodes 41 and the plurality of microphones 42 in the base layer 10 in the above step, a plurality of holes 11 may be formed in the base layer 10 as shown in FIG. 30, but the arrangement is not limited thereto and the plurality of electrodes 41 and the plurality of microphones 42 may arranged on top of the base layer.

In this case, the shape of the base layer may be manufactured by 3D printing, casting, and the like, but the method is not limited thereto.

Next, before performing the step of forming the hydrogel layer on the base layer, a step of chemically treating the base layer on which the plurality of electrodes 41 and the plurality of microphones 42 are arranged so that the base layer and the hydrogel layer may be chemically bonded through light irradiation thereafter may be further included. For example, as shown in FIG. 30, on the base layer, a silicone polymer 12 may be formed, and a BP-ethanol solution 14 in which benzophenone 13 is dissolved in ethanol may be applied.

Next, a step of forming the hydrogel layer on the base layer is performed.

The step of forming of the hydrogel layer includes applying a hydrogel precursor solution 21 on the base layer, and photocuring the hydrogel precursor solution.

In this case, the photocuring of the hydrogel precursor solution may be performed by irradiating the hydrogel precursor solution with light.

Next, a step of forming the stimulus receiving layer 30 on the hydrogel layer is performed.

In this case, the stimulus receiving layer may be preferably composed of a polymer film having elasticity, more preferably may have a larger Young's modulus than the hydrogel layer, and still more preferably, may be a silicone polymer film.

The above step may be preferably performed before photocuring the hydrogel precursor solution in order to prevent the hydrogel precursor solution from contacting oxygen during the light irradiation. In this case, it is more preferable to chemically treat one surface of the stimulus receiving layer in contact with the hydrogel layer so that the stimulus receiving layer and the hydrogel layer may be chemically bonded through light irradiation thereafter. For example, as shown in FIG. 30, the stimulus receiving layer 30 may be formed of a silicone polymer, and the BP-ethanol solution may be applied to one surface in contact with the hydrogel layer.

In another aspect, there is provided a robotic skin including the biomimetic tactile sensor.

The robotic skin may include the biomimetic tactile sensor, thereby making it possible to sense both a deep pressure and a dynamic tactile stimulus, and thus, making it possible to sense various intensities and types of tactile stimuli, such as light vibratory touch, moderate multi-touch, and strong deep pressure.

Hereinafter, the present disclosure will be described in detail through examples and experimental examples.

However, the following examples and experimental examples are only to illustrate the present disclosure, and the contents of the present disclosure are not limited by the following examples.

Example 1

A tactile sensor having a sensing region of 20 cm×20 cm was manufactured by the following method (see FIG. 30).

Step 1: As a base layer, an acrylic plate was cut with a laser cutter (Speedy 300, Trotec) to form a size of 20 cm×20 cm, and then a plurality of holes 11 were formed using 3D printing as shown in FIG. 30 so that 32 electrodes (0.08 unit/cm$^2$) and 25 microphones (0.0625 unit/cm$^2$) could be uniformly mounted. Then, the surface of the acrylic plate was coated with a silicone polymer (Dragon skin 20, Smooth-on) 12 for bonding with the hydrogel.

Step 2: 32 electrodes and 25 microphones were mounted at even intervals in the plurality of holes 11 formed in the acrylic plate. For the electrode used at this time, a low-head stainless steel bolt (CBSTSR4-8, Misumi) with the surface that was functionalized with trimethoxysilyl)propyl methacrylate (TMSPMA) was used to form a stable connection with the hydrogel. In addition, a condenser microphone (CMEJ-4622-25-L082, CUI Inc.) 42 with the upper surface having a capsule film made of silicone elastomer (Dragon skin 20, Smooth-on) was used for the microphone. Then, the surface of the elastic polymer capsule film on the surface of the microphone and the silicone polymer surface of the base layer were treated with a 10% by weight benzophenone (BP)-ethanol solution 14 in order to be bonded to the hydrogel by UV irradiation.

Step 3: A multi-layer structure composed of the silicone elastomer layer and the hydrogel layer was formed. Specifically, in order to form the hydrogel layer, a degassed aqueous precursor solution 21 was prepared by mixing polyacrylamide-alginate (PAAm-Alg) tough hydrogel (13.2 wt % acrylamide, 0.8 wt % sodium alginate, 0.02 wt % MBAA, 0.2 wt % Irgacure 2959) and calcium sulfate slurry (0.1328 times the weight of sodium alginate). The prepared mixture was stirred rapidly and then poured into the base layer treated with the BP-ethanol solution. Then, in order to prevent contact with oxygen, the elastomer layer 30 and the glass plate 31 treated with the BP-ethanol solution were sequentially covered, and were irradiated with UV (CL-3000L, Analytik Jena) for about one hour to cure the hydrogel. At this time, the elastomer layer was a large film made of a silicone elastomer (Dragon skin 20, smooth-on) treated with the BP-ethanol solution, and the thicknesses of the elastomer layer and the hydrogel layer were formed to be 500 μm and 1 cm, respectively. Since both the electrodes and the microphones mounted on the base layer were chemically treated for bonding with the hydrogel, the fabricated tactile sensor was not damaged or peeled off by external forces. After curing was completed, the glass plate was removed to complete the tactile sensor.

Example 2

Figure 19:
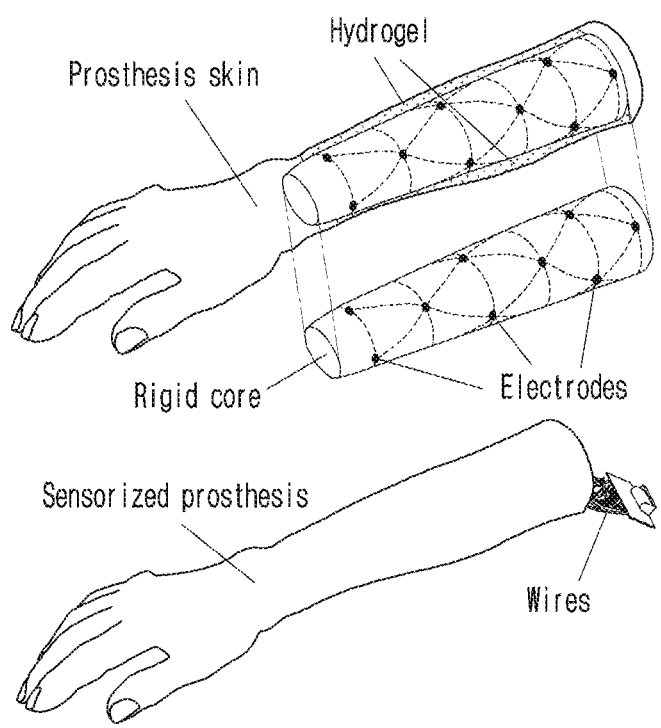
FIG. 19 is a diagram schematically showing a cosmetic prosthesis including a biomimetic tactile sensor according to an embodiment.

A cosmetic prosthesis having the structure shown in FIG. 19 was manufactured by the following method.

As shown in FIG. 19, the cosmetic prosthesis was completed by filling, with the hydrogel layer, a gap between a rigid core in which a plurality of metal electrodes were distributed on a hard cylindrical surface with an empty interior, which is used for a prosthetic hand, and an elastomeric skin.

At this time, the hydrogel layer was formed by mixing a precursor solution of PAAm-Alg hydrogel (13.2 wt % 376 acrylamide, 0.8 wt % sodium alginate, 0.008 wt % MBAA, 0.0465 wt % APS, 0.033 wt % 377 TEMED) and a calcium sulfate slurry (0.1328 times the weight of sodium alginate) and then injecting the mixture into the gap between the elastomeric skin and the rigid core using a syringe. Then, the prosthesis was placed in a water tank to prevent contact with oxygen, and the hydrogel precursor solution was cured for about one hour to complete the cosmetic prosthesis.

The materials used in Examples 1 and 2 are as follows.

Alginate (Sigma, W201502); acrylamide (Bio-Rad, 1610140); MBAA (sigma, M7279); TEMED (sigma, T7024); calcium sulfate (Sigma, C3771); ammonium persulfate (Sigma, A3678); and 2-hydroxy-4'-(2-hydroxyethoxy)-2-methylpropiophenone (Irgacure 2959; Sigma, 410896).

<Experimental Example 1> Pressure-Based Tactile Stimulus Sensing Using EIT and DNN After applying various types of deep pressure (multi-point contact, circle-shaped contact, bar-shaped contact, and wrench-shaped contact) to the biomimetic tactile sensor according to an embodiment, the pressure stimulus was measured by electrical impedance tomography (EIT), the pressure stimulus was reconstructed using the DNN-based EIT algorithm in the following method, and the result is shown in FIG. 11.

(Method of Performing DNN)

Training data was obtained by running a finite element method (FEM) simulation instead of directly applying pressure to the sensor, as different types of pressure may be applied in a simulation environment. Two mesh models were created for the experiment: a non-deformed mesh (control group) and a deformed mesh (experimental group). The two mesh models calculated the degree of deformation (strain map 5) and the corresponding measured voltage (V) of the sensor.

In order to accelerate the simulation, the measured voltage was obtained by assigning a conductivity value of 0 to a mesh element corresponding to an indentation region instead of re-creating the deformed mesh models each time. Since the simulated data differs from the actual measurement data due to measurement noise and modeling errors, the model was generalized using a large amount of data and a model normalization technique.

For machine learning, latent learning (unsupervised) was performed on a deformation map and an EIT measurement vector, and then the projection between the two latent spaces was obtained. The length of the EIT measurement vector was 94, and it was encoded into 84 latent spaces through an auto-encoder constituted by fully connected networks (FCNs) with 4 exponential linear unit (ELU) functions as activation functions. A dropout of 0.03 was added to prevent overfitting during autoencoder training, and Gaussian noise was added to the input to make the trained model robust against measurement noise. Since the pattern itself used for measurement has already been optimized, each piece of measurement data has important information, so the number of neurons in a bottleneck layer does not decrease significantly compared to the length of the measurement data.

The size of the deformation map was 48×48, and the deformation map was encoded into 128 latent spaces through a convolutional autoencoder (CAE). The CAE was also trained with Gaussian noise added to the input stage to ensure that the trained model had denoising properties. The decoder part used (nearest) upsampling+convolution instead of using transposed convolution. The ELU function was used as an activation function in all layers.

When the latent learning step was completed, the projection between the two latent spaces was obtained through supervised learning. The latent projection was an FCN with two hidden layers with 84 inputs and 128 outputs. The number of neurons in the hidden layer was 447, 256, 256, and the activation function was the ELU function. In order to prevent overfitting, the encoder and decoder parts were not trained during latent projection training. The trained model may reconstruct a strain map in real time due to the lightweight network structure. In addition, the reconstruction result was robust to measurement noise and showed relatively few artifacts compared to images obtained through methods in the related art.

As shown in FIG. 11, it can be seen that the tactile sensor according to an embodiment is to successfully reconstruct deformation generated by pressure applied by objects having various shapes. From the above results, it can be seen that the tactile sensor according to an embodiment having a distributed structure with electrode density (0.08 unit/cm$^2$) is to measure pressure stimuli with high accuracy despite using a small number of electrodes.

<Experimental Example 2> Vibration-Based Dynamic Tactile Stimulus Sensing Using PAT Various dynamic tactile stimuli (e.g., patting, tickling, and stroking) were applied to the biomimetic tactile sensor according to an embodiment and positions of dynamic tactile stimuli were calculated using passive acoustic tomography (PAT), and the result is shown in FIG. 15.

At this time, in order to visualize the trajectory of the stimulus, each image frame is then blended using a weight that decays over time.

As shown in FIG. 15, it can be confirmed that the biomimetic tactile sensor according to an embodiment is to successfully sense a dynamic tactile stimulus by finding a vibration generation position (vibration source) using a microphone and passive acoustic tomography (PAT).

<Experimental Example 3> Evaluation of Stimulus Position Measurement Performance In order to evaluate the position measurement performance of the biomimetic tactile sensor according to an embodiment, an experiment was performed in which pressure or vibration was applied to the sensor surface in the following method.

The tactile sensor of Example 1 was disposed on a 3-axis motorized linear stage (EzRobo-5GX, Iwashita Eng.), and a tactile stimulus was applied using an indenter unit or a vibration unit.

The first experiment was to evaluate the EIT-based contact position measurement performance, and pressure was applied to a single point of the sensor with an indenter. The indenter unit consists of a load cell (651AL, KTOYO) and a hemispherical tip with a diameter of 15 mm. The tactile sensor was indented at each node of a 15×15 square grid, and the indentation depth was about 7.5 mm (75% of the thickness). During the experiment, the force value, sensor output, position of the indenter, and indentation depth were recorded, and then the deformation map was reconstructed from the following experimental data, and the position measurement performance was evaluated by comparing the peak position with the actual indentation position.

The second experiment was to evaluate the PAT-based vibration position measurement performance, and vibration was applied to a single point of the tactile sensor with the vibration unit. The vibration unit consists of a voice coil motor (LVCM-032-076-02, Moticont), a cross roller guide (VR3-100X14Z, THK), a spring and a rubber tip. Vibration was applied to a 13×13 square grid on the sensor surface and the vibration frequency was 10 Hz. The dynamic tactile stimulus was localized by applying the PAT algorithm to the intensity of the recorded vibration signal, and the result was compared with the actual contact position.

As the result of the experiment, the single-point pressure stimulus showed a root mean square (RMS) error of 4.2 mm, and the single-point vibration stimulus showed an RMS error of 6.6 mm.

Through the above result, it can be confirmed that the tactile sensor according to an embodiment is to identify the stimulus position with very high accuracy for the pressure stimulus through the electrode structure and arrangement and electrical impedance tomography (EIT), and is to identify the stimulus position with very high accuracy even for the dynamic stimulus through the microphone and passive acoustic tomography (PAT).

<Experimental Example 4> Classification of Dynamic Tactile Stimuli Using CNN

In order to evaluate the accuracy of classifying dynamic tactile stimuli using a CNN of the biomimetic tactile sensor according to an embodiment, an experiment for classifying dynamic tactile stimuli was performed using the following method, and the result is shown in FIG. 16.

Similar to DNN-based EIT, it was performed in real time to classify dynamic tactile stimuli. Training data was obtained through an experiment in which people directly apply dynamic tactile stimuli to the tactile sensor of Example 1. For the experiment, each of ten people applied four unique stimuli (that is, patting, tickling, stroking, and wind blowing) to obtain 500 feature images for each stimulus, resulting in a total of 5000 feature images. Measurement noise and ambient noise data were also collected with the same number of other stimuli and marked as 'None' to indicate the absence of dynamic stimuli (touch).

Then, Gaussian noise was added to the data set collected. In order to prevent overfitting, the data set was randomly divided into a training set, a validation set, and a test set in a ratio of 8:1:1.

The size of each feature image was 89×41, corresponding to a time window with a duration of 0.5 seconds. The CNN was utilized to find spatio-temporal patterns within feature images. The size of the first convolutional layer was 5×5×32 and the image was not padded. The output of the first convolution layer was fed into a batch normalization and rectified linear (ReLU) activation layer. Then, the layer was reduced through a max-pooling layer. The task (that is, conv2D, batch normalization, ReLU, MaxPool) was repeated once more with a different setting. Finally, the output was flattened and went through an FCN layer with a softmax activation layer. The network was trained using an adaptive moment estimation (ADAM) optimizer with an initial learning rate of 0.0002, which dropped by a factor of 0.1 every 5 generations. The mini-batch size was set to 64 and the cross-entropy loss was calculated every 50 iterations (training with mini-batch). Training was set to stop when the loss did not decrease by 20 rounds or more. Training was performed using a single GeForce RTX 3070 GPU.

FIG. 16 is a diagram showing a table of a result obtained by classifying dynamic tactile stimuli.

As shown in FIG. 16, as the result for the classification, it can be confirmed that the trained neural network is to classify dynamic tactile stimuli with a classification accuracy of 98.7%. Therefore, it is expected that the biomimetic tactile sensor according to an embodiment and the robotic skin to which it is applied is to be enabled to understand the intention of touch and perform haptic communication with human beings.

<Experimental Example 5> Evaluation of Resilience

In order to confirm the resilience of the biomimetic tactile sensor according to an embodiment, the multi-layer structure of the sensor (stimulus receiving layer and hydrogel layer) was cut with a surgical blade, and then the hydrogel was bonded using chitosan topohesive prepared by the following method as a hydrogel layer adhesive for the hydrogel layer, an aqueous solution of chitosan was applied between the cut surfaces, and then it was left for 30 minutes to repair the cut part. Then, when the hydrogel was sufficiently adhered, the surface silicone layer was adhered using a silicone adhesive.

(Preparation of Adhesive)

Chitosan topohesive was prepared by the following method. An acidic buffer solution was prepared by dissolving 0.976 g of 4-morpholineethanesulfonic acid powder (MES hydrate; Sigma, M8250) in 50 ml of deionized water. Sodium hydroxide (Sigma, S5881) was added to the buffer solution until the pH reached 4.5. Then, chitosan powder (Sigma, 448877) was added to the solution and thoroughly mixed until the chitosan powder was completely dissolved.

Figure 17:
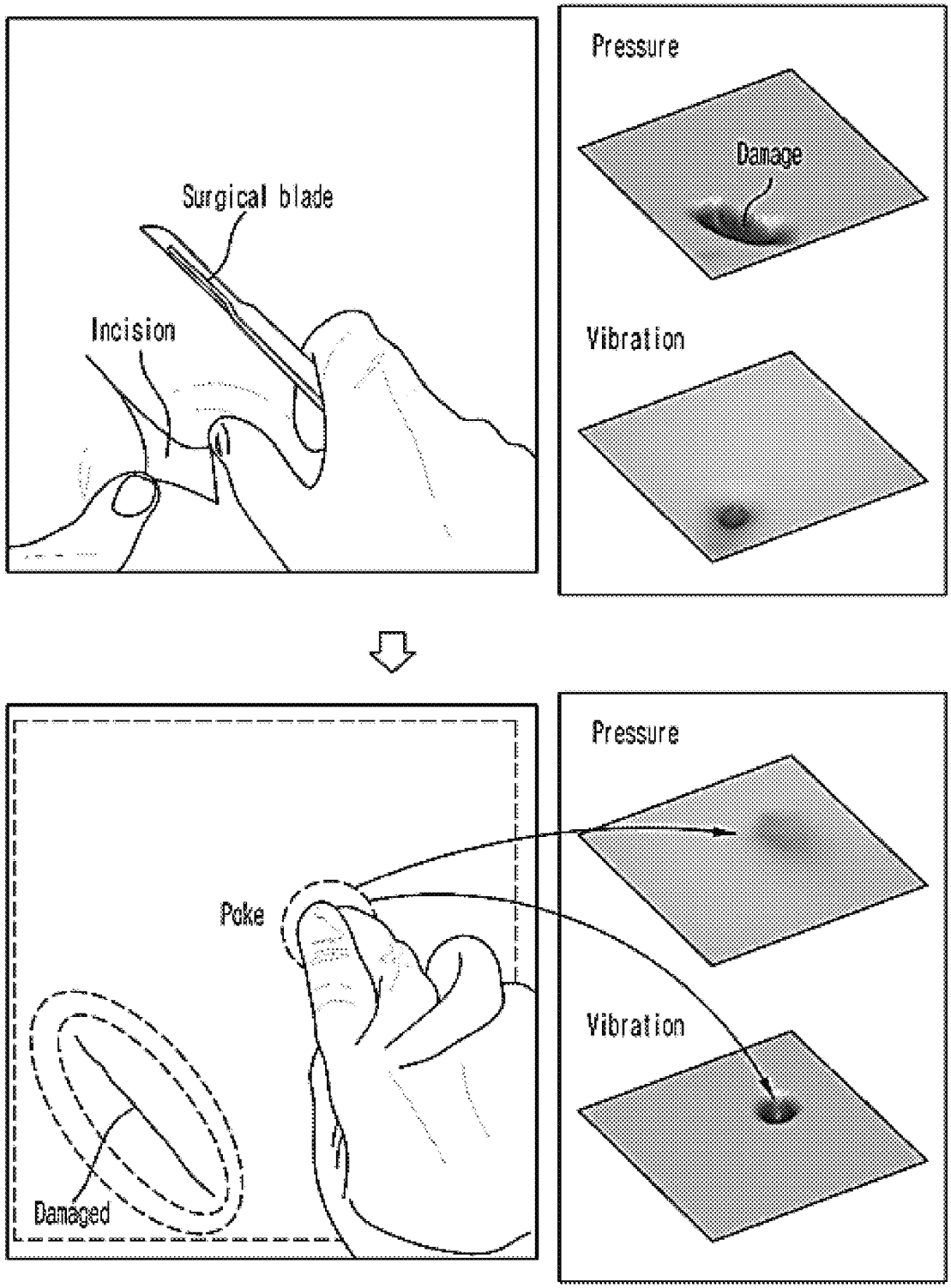
FIGS. 17 and 18 show experimental results of evaluating the ease of recovery after damage of a biomimetic tactile sensor according to an embodiment, where
Figure 18:
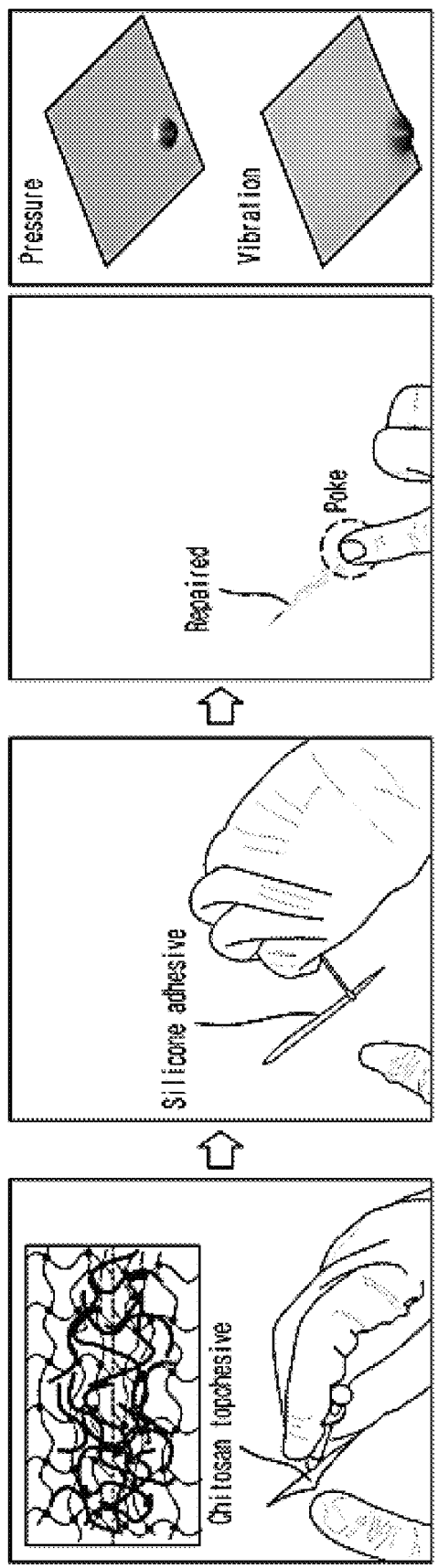

The sensor performance before (that is, the cut state) and after the recovery was evaluated, and the results are shown in FIGS. 17 and 18.

As shown in FIG. 17, when the multi-layer structure of the sensor was cut with a surgical blade, the electrical connection of the sensor was locally disconnected by the incision and the measurement signal was changed. However, it can be confirmed that the tactile sensing function of the tactile sensor is only locally deactivated at the position where the damage occurs and is not degraded at other positions. The above result clearly shows that the biomimetic tactile sensor according to an embodiment is not entirely deactivated even when the sensor is locally damaged.

In addition, as shown in FIG. 18, it can be confirmed that the hydrogel layer and the silicon layer are restored by the adhesive, and it can be also confirmed that the electrical connection is also restored and thus the function of the tactile sensor is restored. Through the above result, it can be confirmed that the biomimetic tactile sensor according to an embodiment is to easily recover its structure and function by using an appropriate adhesive even when physical damage occurs in the stimulus receiving layer and the hydrogel layer.

<Experimental Example 6> Applicability to Various Surfaces

In order to confirm the applicability of the biomimetic tactile sensor according to an embodiment to various surfaces, a pressure-based tactile stimulus was applied to the prosthesis of Example 2 (see FIG. 19) and tactile sensing performance was evaluated using EIT, and the result is shown in FIG. 20.

As shown in FIG. 20, it is confirmed that tactile sensing is possible even in the shape of Example 2 in which electrodes are formed on the cylindrical curved surface.

Through the above result, it is expected that by forming the tactile sensor according to an embodiment on the prosthetic prosthesis, the patient wearing the tactile sensor is to physically interact with the surrounding environment through the entire surface of the prosthesis as well as the fingertips. In addition, in the above design, the inside of the rigid core is hollow, and accordingly, it is expected that the present disclosure is to be easily integrated with other prostheses in the related art and easily applied to various applications.

<Experimental Example 7> Characteristic Evaluation of Multi-Layer Structure

Figure 21A:
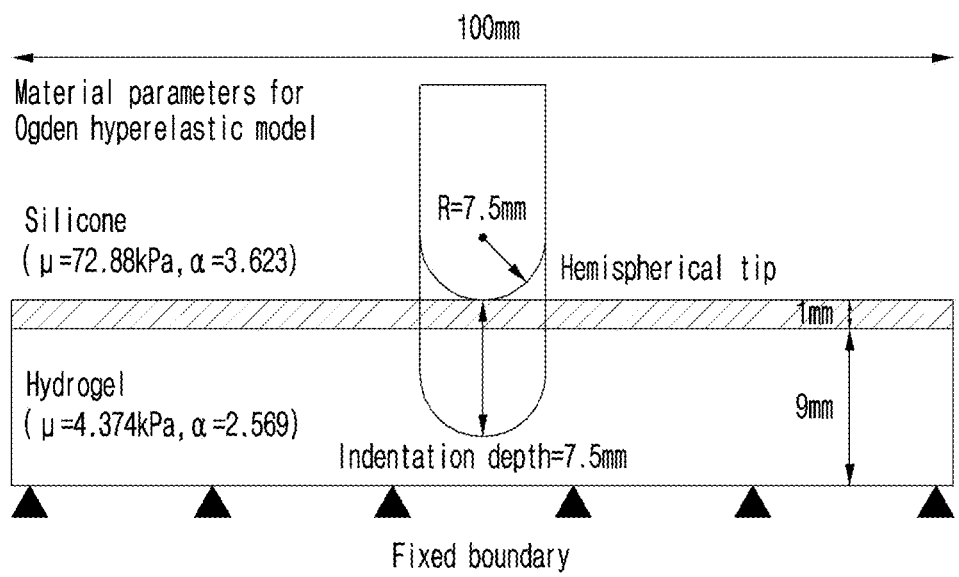
FIG. 21A is a diagram showing indentation test conditions for evaluating an effect of a protective function of a biomimetic tactile sensor according to an embodiment.
Figure 21B:
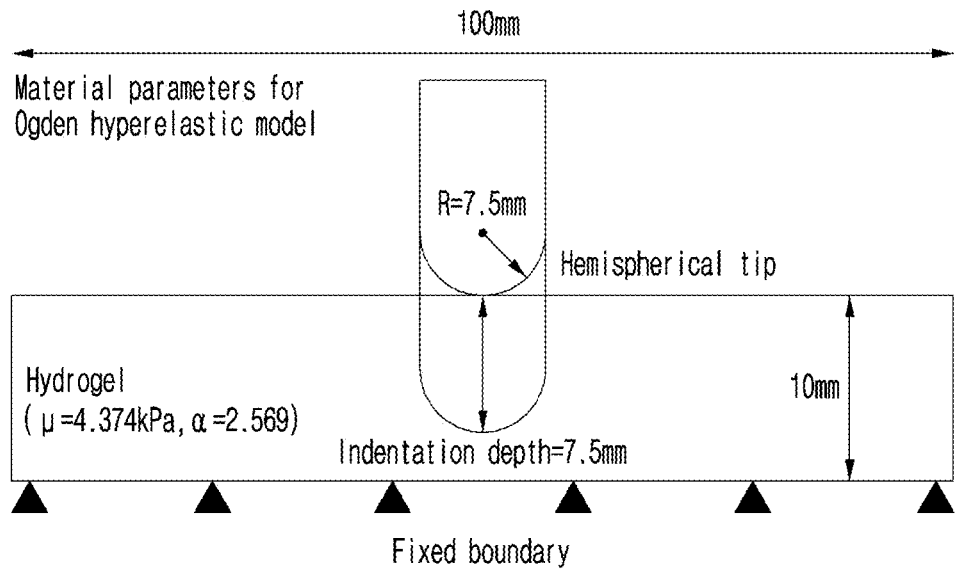
FIG. 21B is a diagram showing indentation test conditions for evaluating an effect of a protective function of a biomimetic tactile sensor according to another embodiment.
Figure 23A:
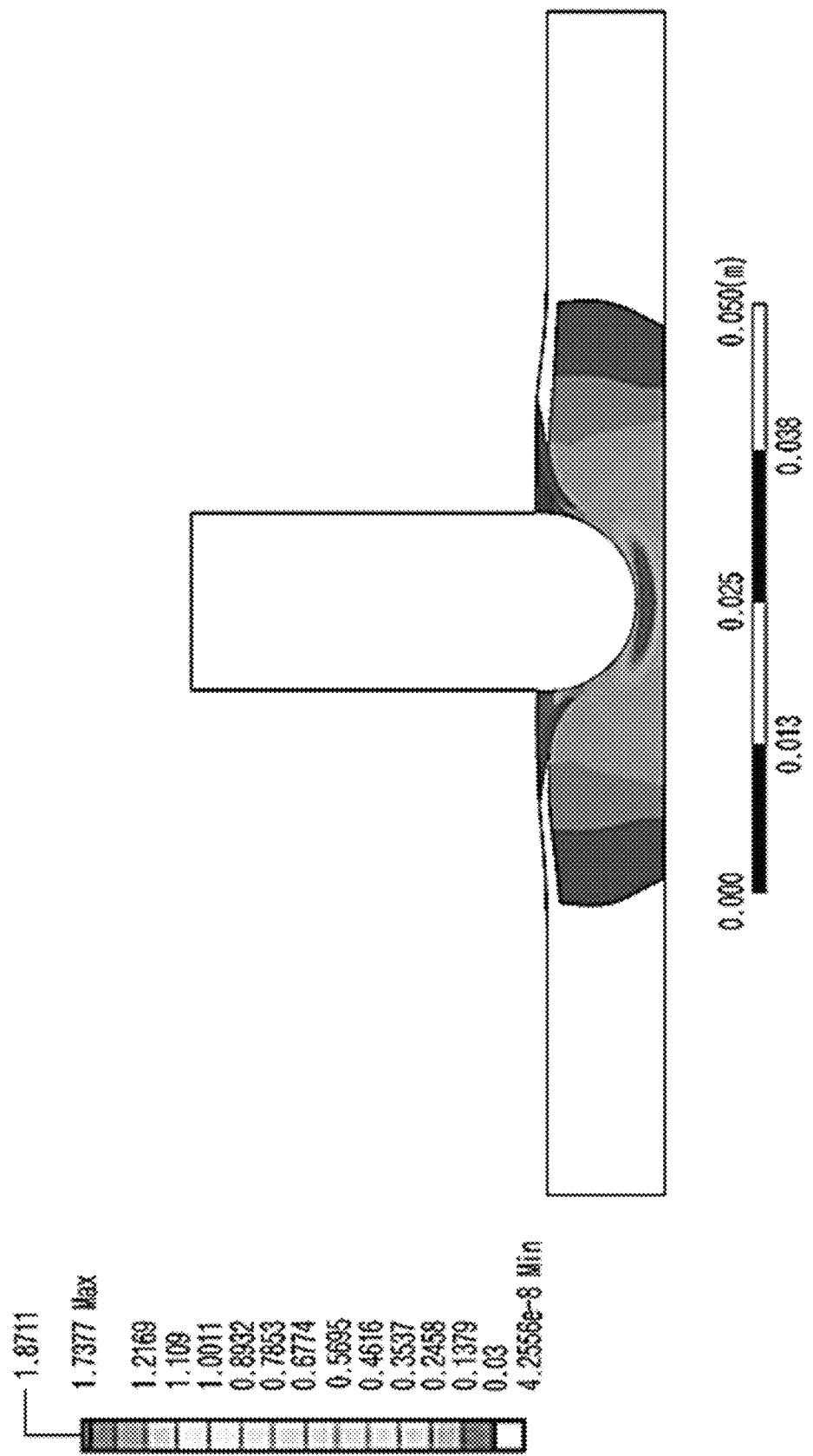
Figure 23B:
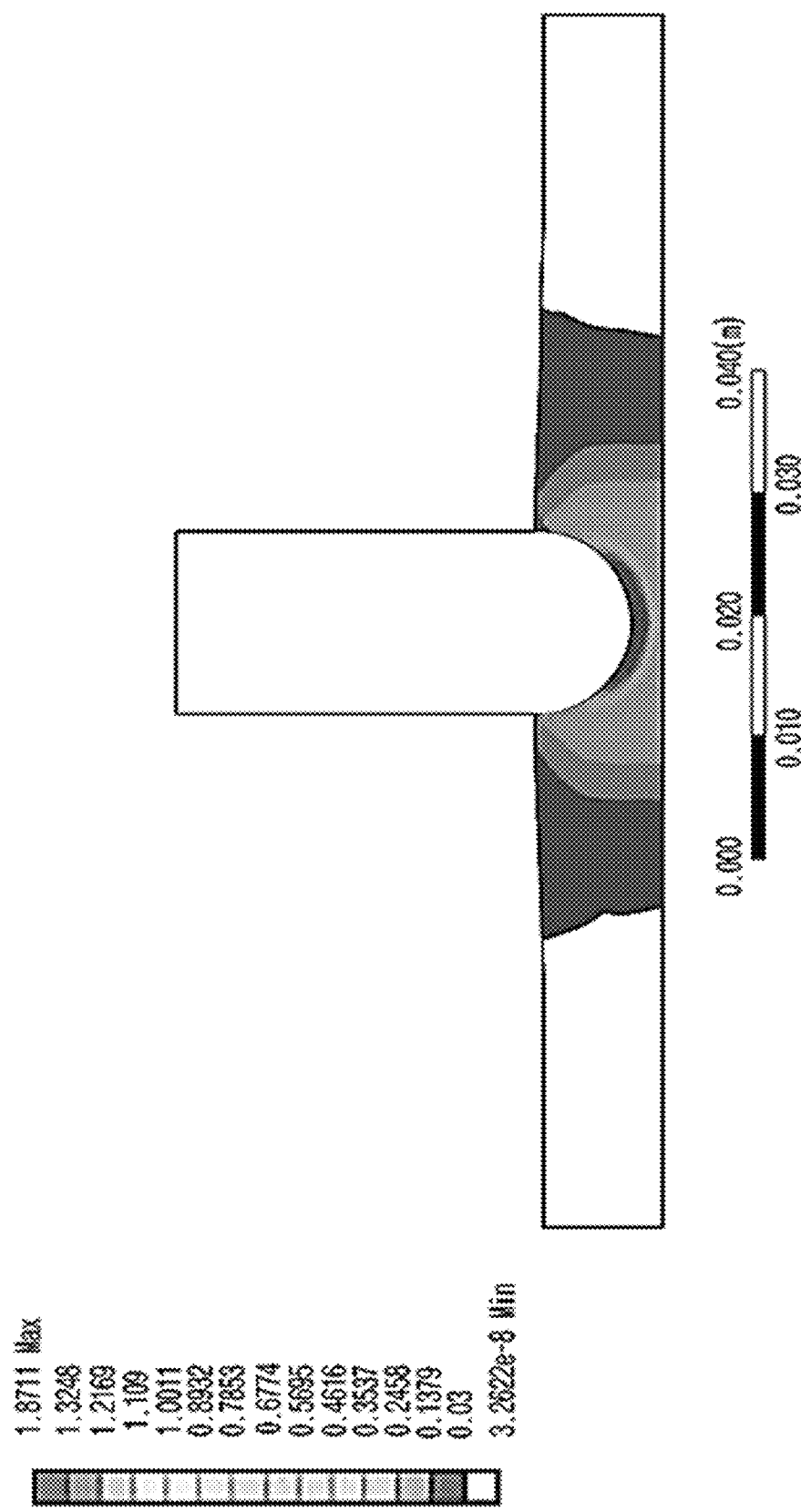
Figure 24A:
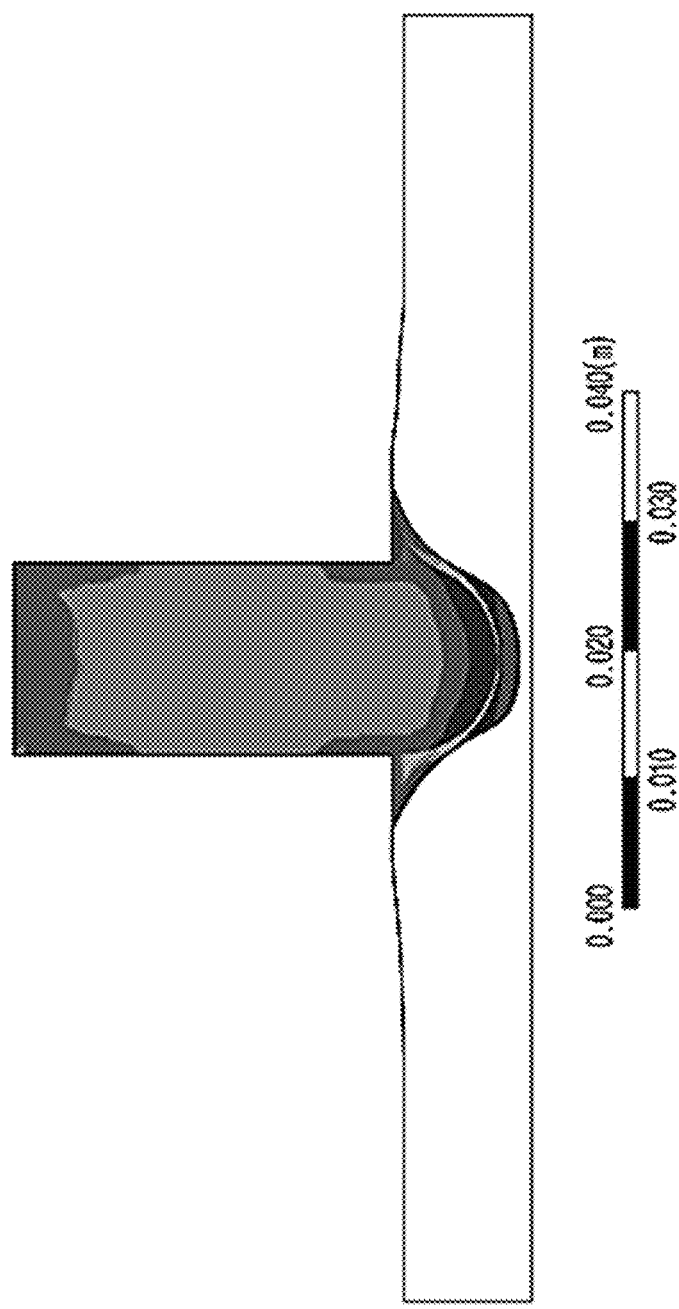
Figure 24B:
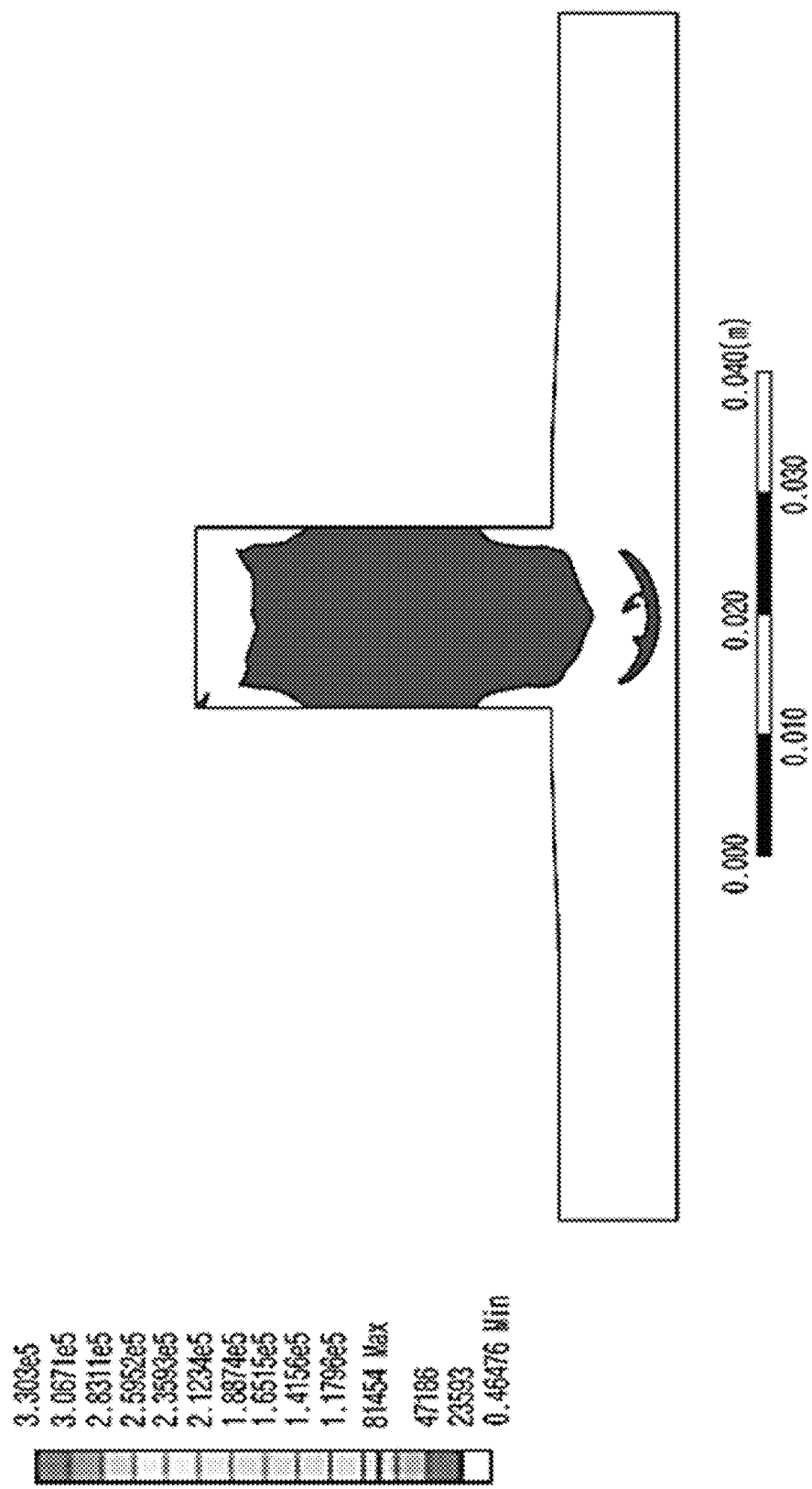
Figure 25:
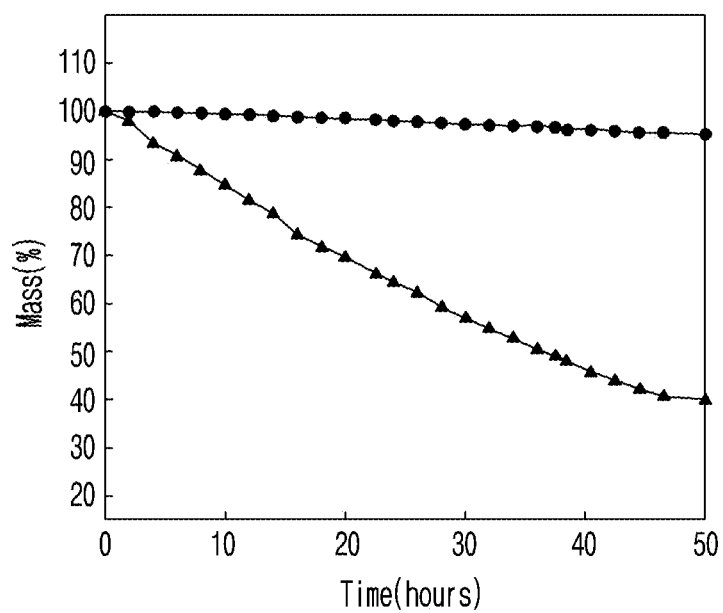
FIG. 25 shows data for a result of evaluating an effect of suppressing a change in water content of a hydrogel of a biomimetic tactile sensor according to an embodiment.
Figure 26:
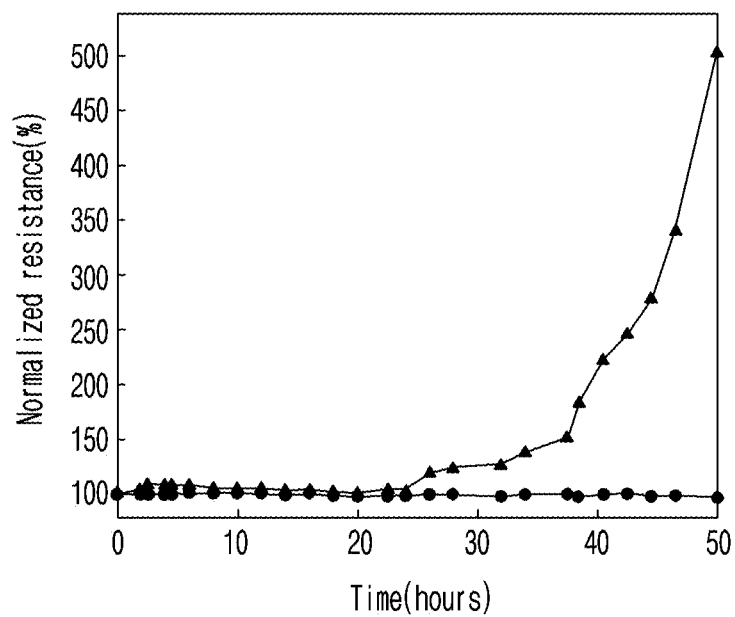
FIG. 26 shows data for a result of evaluating suppression of a change in resistance of the hydrogel of the biomimetic tactile sensor according to an embodiment.

In order to confirm the effect of the protective function against the pressure-based stimulus and the effect of suppressing changes in water content and resistance, of the multi-layer structure of the tactile sensor according to an embodiment, a simulation experiment was performed for the degree of physical deformation due to indentation (1) in the case of forming an elastic polymer film of 1 mm and a hydrogel layer of 9 mm under the conditions of FIGS. 21A and (2) in the case of forming only the hydrogel layer of 10 mm, under the conditions of FIG. 21B, and the results are shown in FIGS. 22A, 22B, 23A, 23B, 24A and 24B, and further, the dehydration prevention effect was measured, and the results are shown in FIGS. 25 and 26.

Figure 22A:
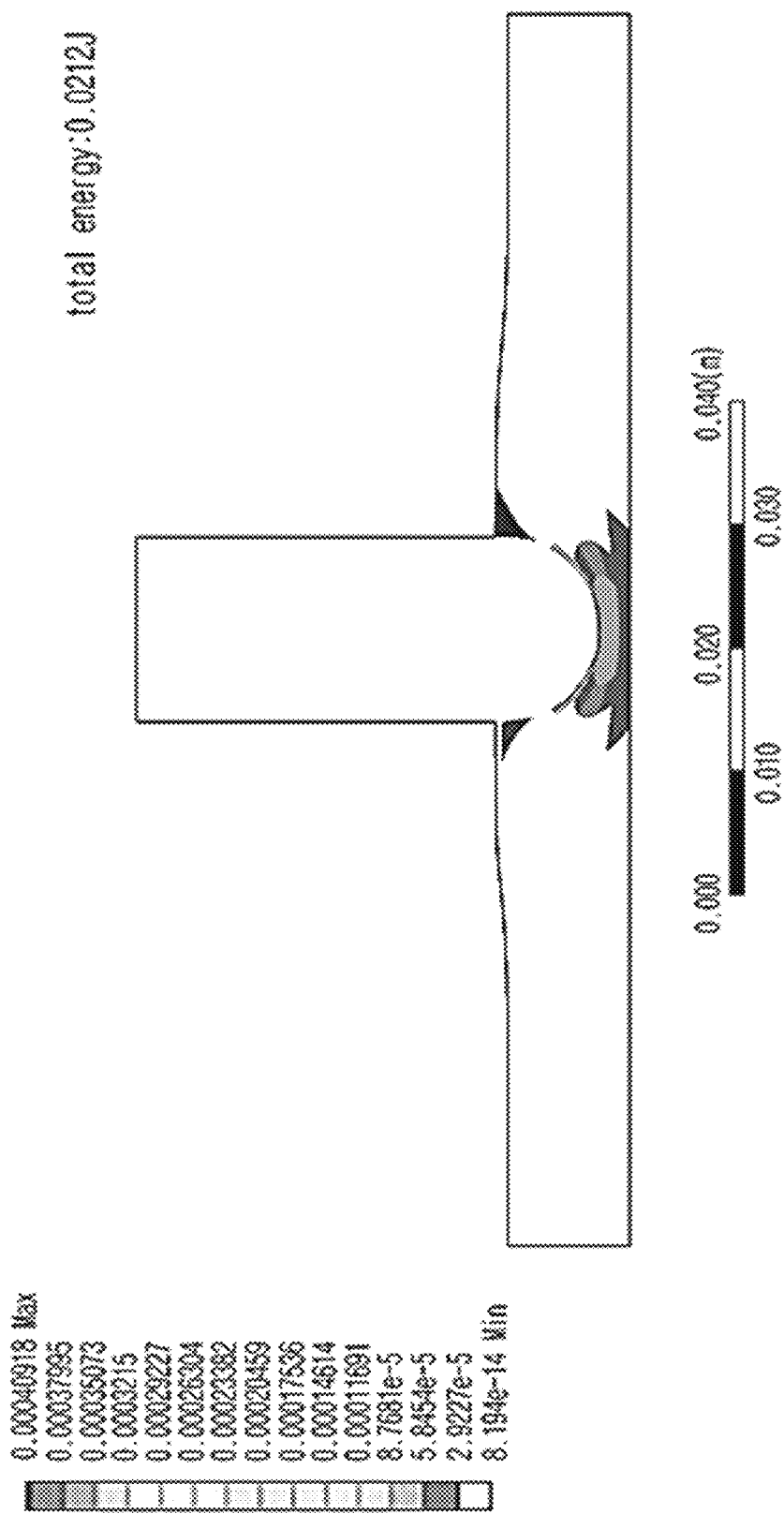
FIGS. 22A, 22B, 23A, 23B, 24A and 24B show indentation test result data for evaluating an effect of a protective function of a biomimetic tactile sensor according to an embodiment, where
Figure 22B:
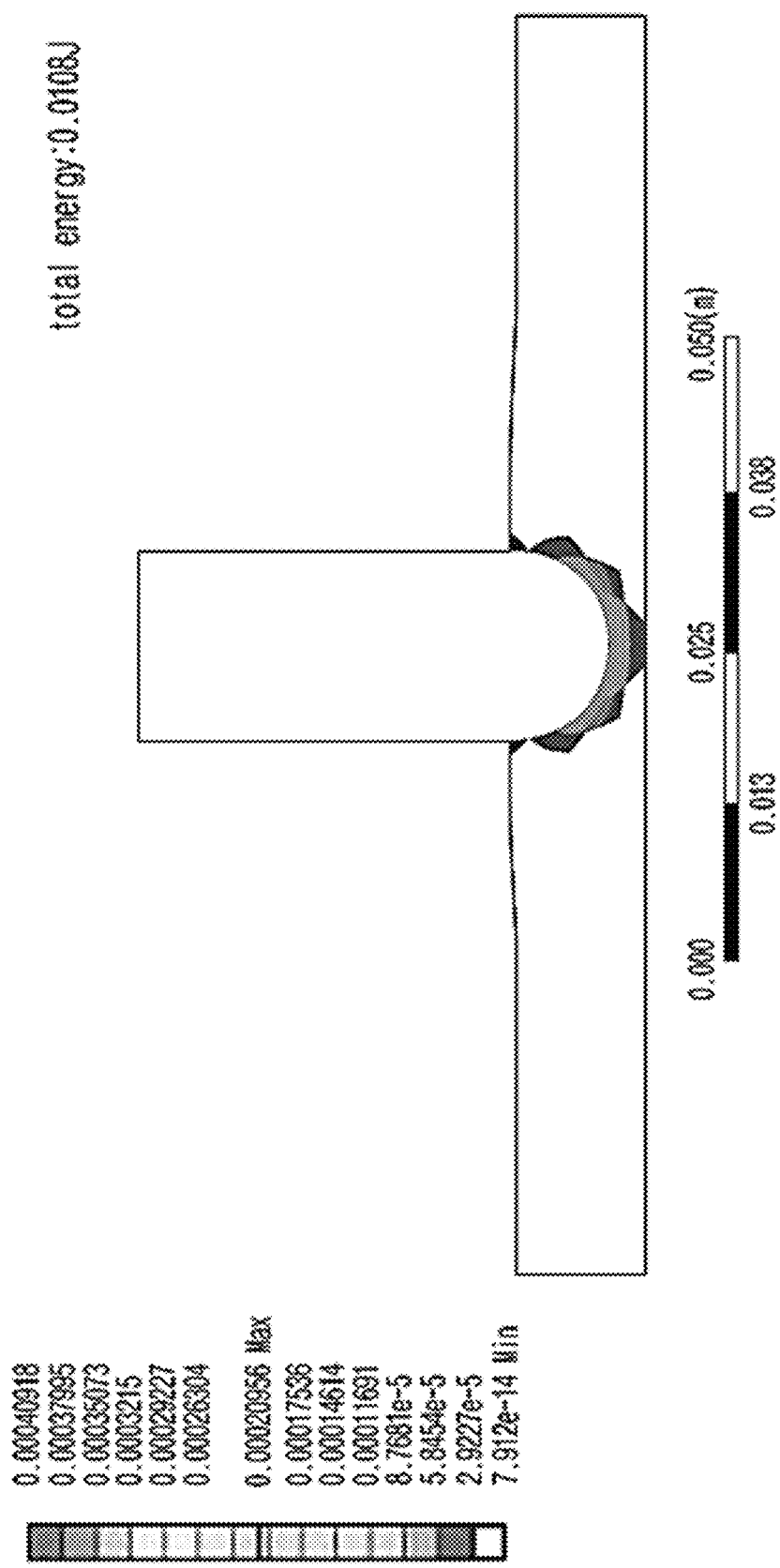

FIG. 22A shows strain energy during an indentation experiment of (1) and FIG. 22B shows strain energy during an indentation experiment of (2), FIG. 23A shows equivalent elastic strain due to indentation during the indentation experiment of (1), FIG. 23B shows equivalent elastic strain due to indentation during the indentation experiment of (2), FIG. 24A shows equivalent (von-mises) stress due to indentation during the indentation experiment of (1) and FIG. 24B show equivalent (von-mises) stress due to indentation during the indentation experiment of (2).

As shown in FIGS. 22A and 22B, the final strain energy was 0.0212 J and 0.0108 J in (1) and (2), respectively, which increased about twice when the elastic polymer film was included. In addition, as shown in FIGS. 23A and 23B, as a test result of the equivalent elastic deformation due to indentation, in (1), it is shown that the elastic polymer film spreads the pressure over a wide region. In addition, as shown in FIGS. 24A and 24B, as a test result of the equivalent stress, in (1), it can be seen that stress is concentrated in the elastic polymer film due to a relatively high Young's modulus.

Through the above results, it can be confirmed that by forming an elastic polymer layer on the hydrogel layer, it is possible to distribute external force over a wide region to prevent damage to the built-in sensor element, thereby further improving the protective function.

In addition, as results of the measurement of the dehydration prevention effect, as shown in FIGS. 25 and 26, it can be confirmed that, in the case of including the elastic polymer film, the moisture reduction is less than 5% even after about 50 hours, and the resistance change due to the fact is insufficient; while, in the case of not including the elastic polymer film, the moisture reduction is about 60% after about 50 hours, which makes the resistance very high. Through the above results, it can be confirmed that the performance stability of the sensor is to be further improved by forming the elastic polymer layer on the hydrogel layer.

Figure 27A:
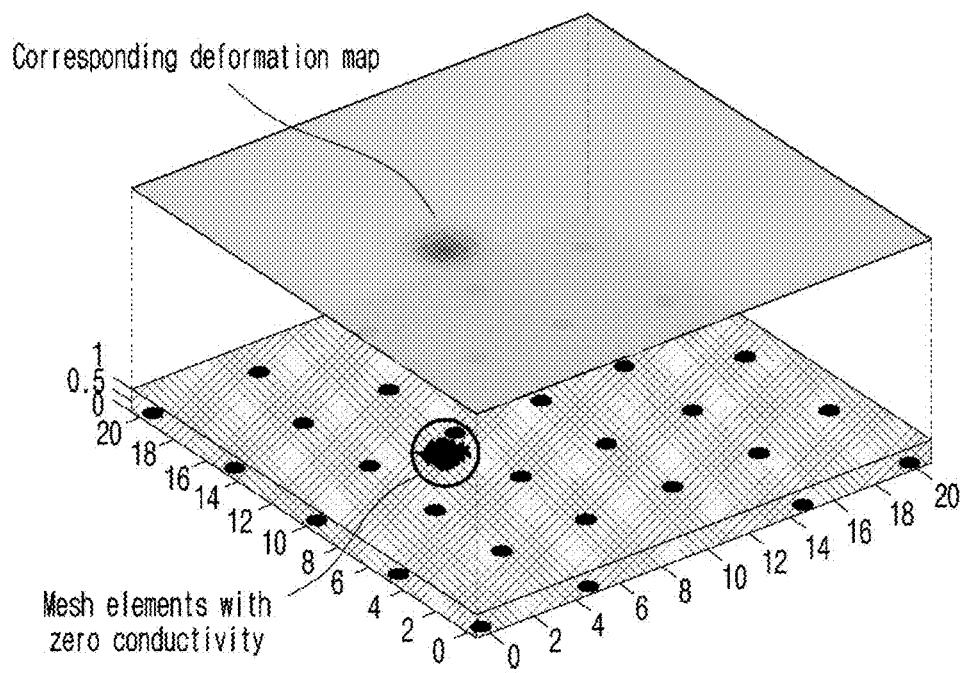
FIG. 27A is a schematic diagram showing a state of electrode arrangements according to Proposed design to evaluate sensing performance for each electrode arrangement.
Figure 27B:
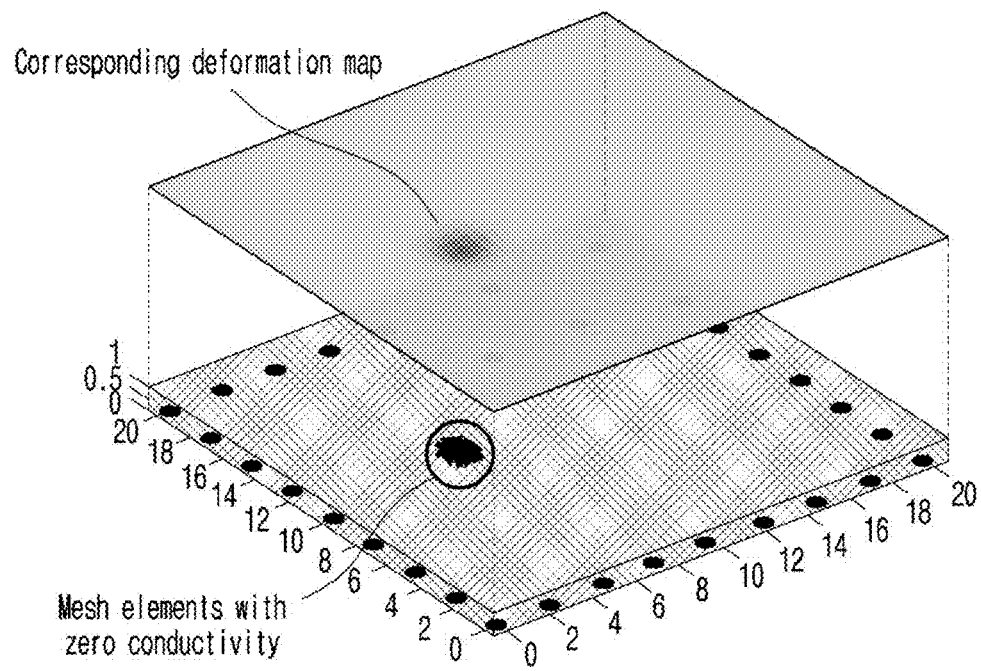
FIG. 27B is a schematic diagram showing a state of electrode arrangements according to a conventional design to evaluate sensing performance for each electrode arrangement.

<Experimental Example 8> Evaluation of Characteristics with Electrode Arrangement For the tactile sensor according to an embodiment, in order to evaluate the sensing performance with the arrangement of electrodes, the sensing performance was evaluated by the FEM simulation method for the structure in which 32 electrodes were arranged to be evenly distributed on the same plane as shown in FIG. 27A and the structure in which they were arranged along an outline as shown in FIG. 27B, and the results are shown in FIGS. 28 and 29.

Figure 28A:
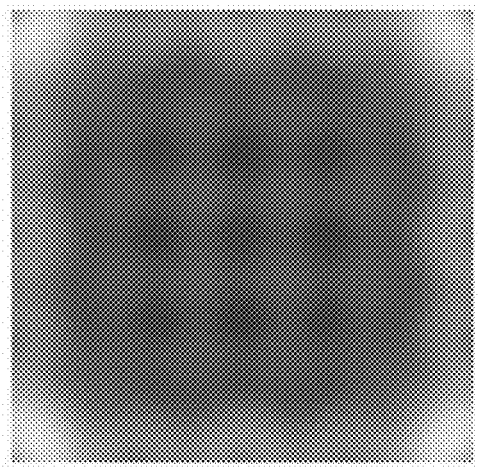
FIG. 28A is a sensitivity map of a result of evaluating detection sensitivity for the electrode arrangements of FIG. 27A.
Figure 28B:
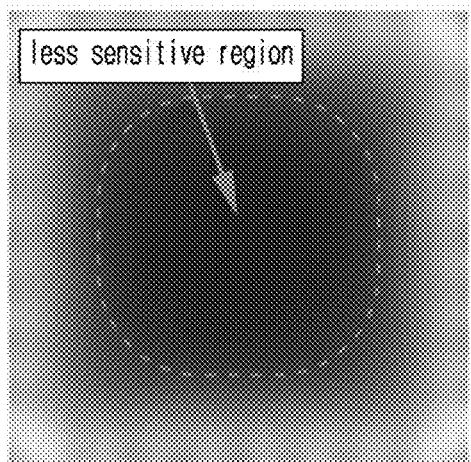
FIG. 28B is a sensitivity maps of a result of evaluating detection sensitivity for the electrode arrangements of FIG. 27B.
Figure 28C:
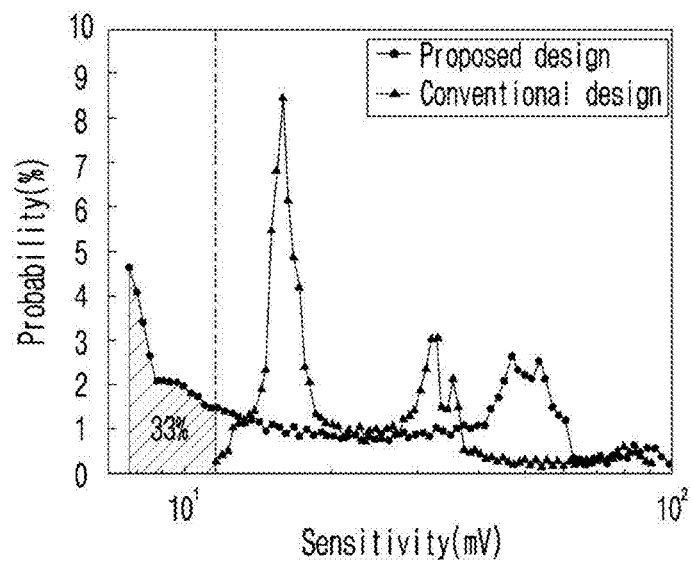
FIG. 28C is a histogram of a result of evaluating detection sensitivity for the electrode arrangements of FIGS. 27A and 27B.

FIG. 28A is a sensitivity map for a sensor region of structure with the electrode arrangement of FIG. 27A, FIG. 28B is a sensitivity map for a sensor region of structure with the electrode arrangement of FIG. 27B and FIG. 28C is a histogram of a result of evaluating detection sensitivity for the electrode arrangements of FIGS. 27A and 27B.

FIG. 29A is a virtual taxel map for measuring the sensor spatial resolution showing taxel size distribution for the electrode arrangement of FIG. 27A, FIG. 29B is a taxel map for the electrode arrangement of FIG. 27B, and FIG. 29C is a histogram of taxel sizes for the electrode arrangements of FIGS. 27A and 27B. In this case, the virtual taxel was defined by quantizing the similarity surface with a threshold value of 0.7 for quantification.

As shown in FIGS. 28A and 28B, it can be confirmed that a uniform and high sensor signal is to be obtained in the structure in which electrodes are arranged to be evenly distributed (FIG. 27A); while in the structure in which electrodes are arranged along the outline (FIG. 27B), the sensor sensitivity is low in the central region where the electrodes are not arranged. In particular, in this case, it can be confirmed that a sensitivity lower than the minimum sensitivity appears in 33% of the sensing region.

As shown in FIGS. 29A and 29B, it was confirmed that the structure in which electrodes are arranged to be evenly distributed (FIG. 27A) exhibits significantly better spatial resolution than the structure in which electrodes are arranged along the outline (FIG. 27B).

Specifically, in the structure in which electrodes are arranged to be evenly distributed (FIG. 27A), the virtual taxels were evenly arranged, and the average area of the virtual taxels was 12.6 cm$^2$ (Std.=1.4 cm$^2$). This is about 3.15% of the sensing region. In addition, as a result of obtaining tactile resolution through tomography, single point contact (deep pressure) could be localized with an error of about 4.2 mm, and the two-point discrimination threshold was found to be at least 41 mm (average diameter of the virtual taxel), a value superior to that of the human back or thigh.

On the other hand, in the structure in which the electrodes are arranged along the outline (FIG. 27B), the virtual taxel was very large and overlapped particularly in the central region, and the average area of the virtual taxel is 30.5 cm$^2$ (Std.=27.3 cm$^2$, Max.=112 cm$^2$), which was very large. This means that all positions of the sensor change the output vector in a similar pattern, resulting in impaired tactile sensation. Accordingly, it can be confirmed that it is possible to localize a single point stimulus, but it is difficult to distinguish multi-point contacts, especially tactile stimuli that are closely positioned.

Through the above result, in arranging the electrodes on the base layer, the electrodes may be arranged to be distributed at the same or substantially the same, or similar intervals, and as a result, it can be seen that a higher sensing sensitivity for the entire sensing region is possible and further improvement in the ability to discriminate between multiple tactile stimuli is possible.

The biomimetic tactile sensor according to an embodiment may sense both a deep pressure and a dynamic tactile stimulus through electrodes and microphones, and thus, may sense various intensities and types of tactile stimuli, such as light vibratory touch, moderate multi-touch, and strong deep pressure.

In addition, the biomimetic tactile sensor according to an embodiment may have a multi-layer structure and may be made according to a tomography imaging method, and thus may have high robustness and repairability against breakage due to strong impact and cutting, which may, in turn, provide advantages of excellent practicality and applicability.

In addition, the biomimetic tactile sensor according to an embodiment may have an appearance and operating principle similar to human skin, have excellent applicability as a whole-body robotic skin with its ease of application to a large area and various types of surfaces, and provide a tactile sensation similar to that of human skin, and thus may be used to build empathy and affinity in certain applications, such as prosthetics, for example, prosthetic hands, and entertainment robots.

What is claimed is:

1. A biomimetic tactile sensor comprising:
   a base layer on which a plurality of electrodes and a plurality of microphones are distributed;
   a hydrogel layer disposed on the base layer covering the plurality of electrodes and the plurality of microphones; and
   a stimulus receiving layer disposed on the hydrogel layer, wherein the biomimetic tactile sensor senses a tactile stimulus accompanied by pressure, vibration, or both via the plurality of electrodes and the plurality of microphones.

2. The biomimetic tactile sensor as set forth in claim 1, wherein the hydrogel layer has piezoresistance and acts as a medium for transmitting vibration.

3. The biomimetic tactile sensor as set forth in claim 1, wherein the tactile sensor senses a pressure-based tactile stimulus using electrical impedance tomography (EIT).

4. The biomimetic tactile sensor as set forth in claim 3, wherein the tactile sensor reconstructs data measured by the electrical impedance tomography (EIT) using an artificial neural network.

5. The biomimetic tactile sensor as set forth in claim 1, wherein the tactile sensor senses a vibration-based dynamic tactile stimulus through the microphones using passive acoustic tomography (PAT).

6. The biomimetic tactile sensor as set forth in claim 5, wherein the tactile sensor analyzes at least one of an intensity and an arrival time of vibration received by the microphones to determine a position where the vibration occurs.

7. The biomimetic tactile sensor as set forth in claim 5, wherein the tactile sensor classifies dynamic tactile stimuli received through the microphones using an artificial neural network.

8. The biomimetic tactile sensor as set forth in claim 5, wherein the dynamic tactile stimulus includes tapping, rubbing, sweeping, scratching, and tickling.

9. The biomimetic tactile sensor as set forth in claim 1, wherein the stimulus receiving layer is a polymer film having elasticity.

10. The biomimetic tactile sensor as set forth in claim 9, wherein the stimulus receiving layer has a large Young's modulus as compared with the hydrogel layer.

11. The biomimetic tactile sensor as set forth in claim 10, wherein the stimulus receiving layer is a silicone polymer film.

12. The biomimetic tactile sensor as set forth in claim 1, wherein a structure and function of the stimulus receiving layer and the hydrogel layer are recoverable from physical damage.

13. The biomimetic tactile sensor as set forth in claim 1, wherein the microphone is a microphone in which a capsule film made of a polymer having elasticity is formed on an upper surface in contact with the hydrogel.

14. The biomimetic tactile sensor as set forth in claim 13, wherein the capsule film has an empty space therein.

15. A preparation method for the the biomimetic tactile sensor as set forth in claim 1, the preparation method comprising:
    arranging a plurality of electrodes and a plurality of microphones to be distributed on a base layer;
    forming a hydrogel layer on the base layer; and
    forming a stimulus receiving layer on the hydrogel layer.

16. The preparation method as set forth in claim 15, wherein the microphone is a microphone in which a capsule film made of a polymer having elasticity is formed on an upper surface in contact with the hydrogel.

17. The preparation method as set forth in claim 15, wherein the forming of the hydrogel layer includes:
    applying a hydrogel precursor solution on the base layer; and
    photocuring the hydrogel precursor solution.

18. A robotic skin comprising the biomimetic tactile sensor as set forth in claim 1.

* * * * *